United States Patent
Suh et al.

(10) Patent No.: US 10,171,277 B2
(45) Date of Patent: Jan. 1, 2019

(54) FRAME FORMAT AND DESIGN OF WAKE-UP FRAME FOR A WAKE-UP RECEIVER

(71) Applicants: Jung Hoon Suh, Ottawa (CA); Osama Aboul-Magd, Ottawa (CA); Kwok Shum Au, Ottawa (CA)

(72) Inventors: Jung Hoon Suh, Ottawa (CA); Osama Aboul-Magd, Ottawa (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/604,220

(22) Filed: May 24, 2017

(65) Prior Publication Data

US 2018/0019902 A1   Jan. 18, 2018

Related U.S. Application Data

(60) Provisional application No. 62/362,410, filed on Jul. 14, 2016, provisional application No. 62/405,517, filed on Oct. 7, 2016, provisional application No. 62/446,143, filed on Jan. 13, 2017.

(51) Int. Cl.
*H04L 27/26* (2006.01)
*H04L 5/00* (2006.01)

(52) U.S. Cl.
CPC ........ *H04L 27/2607* (2013.01); *H04L 5/0007* (2013.01); *H04L 27/2628* (2013.01)

(58) Field of Classification Search
USPC ........ 375/260, 228, 130; 370/328, 203, 252
See application file for complete search history.

(56) References Cited

U.S. PATENT DOCUMENTS

| | | | |
|---|---|---|---|
| 6,622,251 B1 | 9/2003 | Lindskog et al. | |
| 9,131,399 B2 | 9/2015 | Liu et al. | |
| 9,883,473 B2 | 1/2018 | Azizi et al. | |
| 2003/0031120 A1* | 2/2003 | Miyato | H04L 25/03866 370/203 |
| 2004/0233973 A1* | 11/2004 | Fullerton | H04B 1/69 375/130 |
| 2005/0237161 A1 | 10/2005 | Lee et al. | |

(Continued)

FOREIGN PATENT DOCUMENTS

| | | |
|---|---|---|
| CN | 1960365 A | 5/2007 |
| CN | 101087220 A | 12/2007 |

(Continued)

OTHER PUBLICATIONS

Mingyoung Park, et al. "16/0341r0, LP-WUR (Low-Power Wake-Up Receiver) Follow-Up", IEEE 802.11 LRLP TIG, Mar. 2016.

(Continued)

*Primary Examiner* — Eva Puente

(57) ABSTRACT

Methods and systems for providing a low-rate data signal. Received input data bits are Manchester modulated onto successive multicarrier symbols in the time domain. Each multicarrier symbol includes orthogonal sub-carrier and a null sub-carrier. A stored waveform can be retrieved to code the sub-carriers. The successive multicarrier symbols are up-converted to a carrier frequency to provide the low-rate data signal, and the low-rate data signal is transmitted.

13 Claims, 18 Drawing Sheets

(56) References Cited

U.S. PATENT DOCUMENTS

| | | | |
|---|---|---|---|
| 2006/0248208 A1 | 11/2006 | Walbeck et al. | |
| 2007/0076683 A1 | 4/2007 | Chung et al. | |
| 2007/0174916 A1 | 7/2007 | Ching | |
| 2007/0195911 A1* | 8/2007 | Ochi | H04L 25/4904 375/324 |
| 2007/0273484 A1 | 11/2007 | Cederlof et al. | |
| 2008/0056219 A1 | 3/2008 | Venkatachalam | |
| 2008/0122584 A1 | 5/2008 | Itasaki et al. | |
| 2008/0303636 A1 | 12/2008 | Chatte et al. | |
| 2010/0260159 A1 | 10/2010 | Zhang et al. | |
| 2011/0090977 A1* | 4/2011 | Zhong | H04L 5/0044 375/260 |
| 2011/0122938 A1* | 5/2011 | Kameya | H04L 27/263 375/228 |
| 2012/0191995 A1 | 7/2012 | Naveh et al. | |
| 2012/0321006 A1* | 12/2012 | Akita | H04L 27/2657 375/260 |
| 2013/0182795 A1 | 7/2013 | Cherian et al. | |
| 2013/0230035 A1 | 9/2013 | Grandhi et al. | |
| 2013/0294431 A1 | 11/2013 | Wang et al. | |
| 2014/0029511 A1* | 1/2014 | Park | H04L 27/2631 370/328 |
| 2014/0112229 A1 | 4/2014 | Merlin et al. | |
| 2015/0103727 A1 | 4/2015 | Zhang et al. | |
| 2015/0245290 A1 | 8/2015 | Liu | |
| 2016/0007288 A1 | 1/2016 | Samardzija et al. | |
| 2016/0100414 A1 | 4/2016 | Guvenkaya et al. | |
| 2016/0295511 A1 | 10/2016 | Qi et al. | |
| 2016/0380712 A1* | 12/2016 | Levy | H04B 7/0417 370/252 |
| 2017/0064634 A1 | 3/2017 | Van Horn et al. | |
| 2017/0111820 A1 | 4/2017 | Wang et al. | |
| 2017/0111865 A1 | 4/2017 | Seok | |
| 2017/0111866 A1* | 4/2017 | Park | H04W 52/0235 |
| 2017/0134943 A1 | 5/2017 | Min et al. | |
| 2017/0136992 A1 | 5/2017 | Hamada et al. | |
| 2017/0295538 A1 | 10/2017 | Zhang et al. | |
| 2018/0007619 A1 | 1/2018 | Zhuang et al. | |
| 2018/0007629 A1 | 1/2018 | Dorrance et al. | |
| 2018/0013591 A1* | 1/2018 | Shafiee | H04L 25/0204 |
| 2018/0020397 A1* | 1/2018 | Aminaka | H04W 48/16 |
| 2018/0176066 A1 | 6/2018 | Lim et al. | |

FOREIGN PATENT DOCUMENTS

| | | |
|---|---|---|
| CN | 101237438 A | 8/2008 |
| CN | 103138949 A | 6/2013 |
| CN | 104272797 A | 1/2015 |
| CN | 104301973 A | 1/2015 |
| CN | 105144649 A | 12/2015 |
| CN | 105723780 A | 6/2016 |
| EP | 2843892 A1 | 3/2015 |

OTHER PUBLICATIONS

Eunsung Park, et al. "16/1144r0, Further Investigation on WUR Performance", IEEE 802.11 WUR SG, Sep. 2016.

* cited by examiner

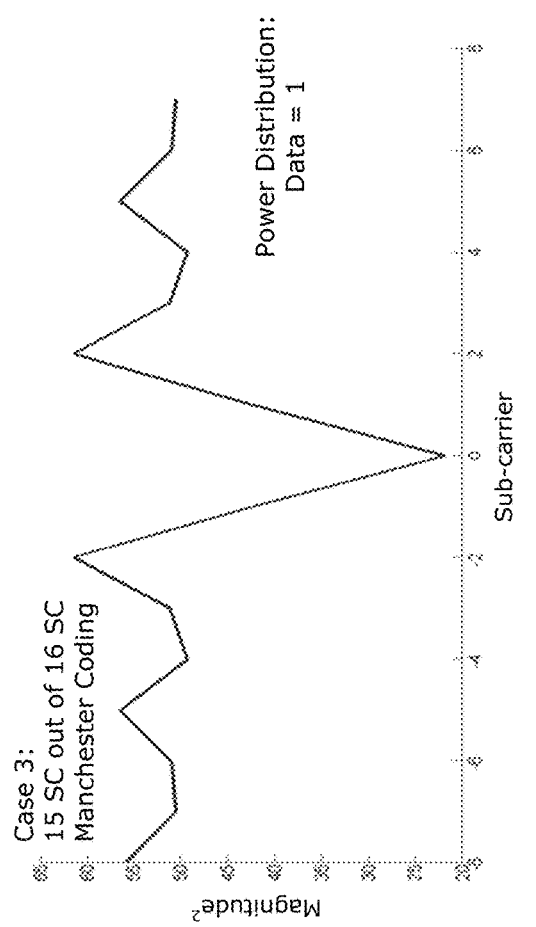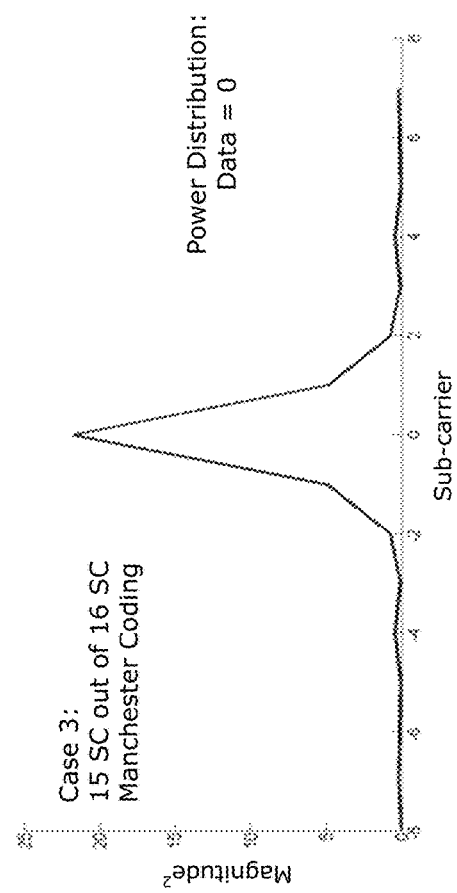

FRAME FORMAT AND DESIGN OF WAKE-UP FRAME FOR A WAKE-UP RECEIVER

CROSS-REFERENCE TO RELATED APPLICATIONS

The present disclosure claims priority from U.S. provisional patent application No. 62/362,410, filed Jul. 14, 2016; U.S. provisional patent application No. 62/405,517, filed Oct. 7, 2016; and U.S. provisional patent application No. 62/446,143, filed Jan. 13, 2017, the entireties of which are hereby incorporated by reference.

FIELD

The present application relates to methods and systems for communicating with a wake-up receiver, including design of a wake-up frame detectable by a wake-up receiver.

BACKGROUND

In wireless communication, efficient use of the available power is one of the main goals of system design. Often, a wireless local area network (WLAN) device, such as in Internet of Things (IoT) applications, relies on a limited power supply (e.g., as supplied by rechargeable or non-rechargeable batteries). Examples of such a device may include sensor devices located in remote fields measuring some physical phenomenon, e.g., water level or temperature; and wearable devices measuring some bodily function, e.g., pulse rate.

Such a device may be designed to operate on a low duty cycle (e.g., communicating with an access point (AP) only once per day) and thus it may not be appropriate for its WLAN receiver circuit to be always on. The limited power supply (e.g., battery) of the device may be quickly exhausted if not provided with an appropriate sleep mode for the WLAN receiver circuit and an appropriate wake-up mechanism. The wake-up mechanism may require communication of a wake-up signal from the AP to the device.

SUMMARY

In some example embodiments, there is provided a frame format for a wake-up frame using orthogonal frequency-division multiplexing (OFDM), including numerology for the OFDM symbol.

In some example embodiments, there is provided a design for the short training field for a wake-up frame. The example design may enable identification of the wake-up frame by the receiving station.

Some example embodiments are directed to a system and methods that use a wake up radio frame with an orthogonal frequency-division multiplexed (OFDM) based and OOK (On-Off Keying) modulated waveform design for a WUR, which can be detected using only envelope detection without channel estimation and equalization.

In some example embodiments, filtered OFDM may be used to transmit the wake-up frame, within a IEEE 802.11ax Multi User-Physical layer Protocol Data Unit (MU-PPDU).

In some aspects, the present disclosure describes a method of waking up a wireless receiving device having a wake-up receiver (WUR) circuit. The method includes transmitting a low-power wake-up signal comprising a wake-up frame (WUF) including a wake-up packet (WUP) based on orthogonal frequency-division multiplexing (OFDM). The WUP uses 16 tones of an OFDM symbol.

In any of the preceding aspects/embodiments, the 16 tones may include one DC tone, 15 data tones and no edge tones.

In any of the preceding aspects/embodiments, the WUF may include a legacy preamble portion pre-pended to the WUP.

In any of the preceding aspects/embodiments, the WUP may have a bandwidth narrower than a legacy bandwidth of the legacy preamble.

In any of the preceding aspects/embodiments, the WUP may have a bandwidth of 5 MHz and the 16 tones are carried using sub-carriers having 312.5 kHz spacing.

In any of the preceding aspects/embodiments, the WUP may be transmitted in absence of a legacy preamble.

In any of the preceding aspects/embodiments, the WUP may include a short training field (STF), the STF containing a short training sequence (STS) enabling detection of the WUP distinct from other signals.

In any of the preceding aspects/embodiments, the STS may contain non-zero values at $S_{-8}$, $S_{-4}$, and $S_4$ sequence positions in the 16 tones.

In any of the preceding aspects/embodiments, the WUP may have a bandwidth narrower than 20 MHz and the 16 tones of the WUP may be transmitted using filtered OFDM, using a 20 MHz spectral mask.

In any of the preceding aspects/embodiments, transmission of the WUF may be scheduled together with transmission of a IEEE 802.11ax orthogonal frequency-divisional multiple access (OFDMA) scheduled resource unit (RU).

In some aspects, the present description describes a method of waking up a wireless receiving device having a wake-up receiver (WUR) circuit. The method includes receiving a wake-up signal carrying a wake-up frame (WUF) including a wake-up packet (WUP) based on 16-point orthogonal frequency-division multiplexing (OFDM). The method also includes decoding the WUP based on the 16-point OFDM. The method also includes transmitting an internal wake-up signal to wake up a main receiver circuit of the wireless receiving device.

In any of the preceding aspects/embodiments, the WUF may include a legacy preamble portion pre-pended to the WUP, and the WUP may have a bandwidth narrower than a legacy bandwidth of the legacy preamble. The method may also include filtering out the legacy preamble portion using a narrow bandwidth filter.

In any of the preceding aspects/embodiments, the WUP may have a bandwidth of 5 MHz.

In any of the preceding aspects/embodiments, the WUP may have a bandwidth of 1.25 MHz.

In any of the preceding aspects/embodiments, the WUP may include a short training field (STF), the STF containing a short training sequence (STS). The method may include detecting the WUP distinct from other signals based on the STS.

In any of the preceding aspects/embodiments, the STS may contain non-zero values at $S_{-8}$, $S_{-4}$ and $S_4$ sequence positions in the 16-point OFDM.

According to some aspects, the present disclosure describes a method of providing a wake-up signal. The method includes: modulating successive on-off keying (OOK) mapped data bits of a wake-up frame to generate corresponding successive multicarrier symbols, wherein for each multicarrier symbol the corresponding OOK mapped data bit is modulated onto a set of orthogonal sub-carriers, each multicarrier symbol including a null sub-carrier; inserting a guard interval period into each of the successive multicarrier symbols; upconverting the successive multicarrier symbols to a carrier frequency to provide a wake-up signal; and transmitting the wake-up signal over a wireless channel.

In any of the preceding aspects/embodiments, the multicarrier symbol may include M orthogonal sub-carriers, wherein for each multicarrier symbol the corresponding OOK mapped data bit is modulated onto each of M−1 of the orthogonal sub-carriers.

In any of the preceding aspects/embodiments, M may equal 16, the sub-carriers may have an inter-carrier spacing (SS) of 312.5 KHz, each multicarrier symbol may have a useful symbol time period ($T_u$) of 3.2 µs, and the inserted guard interval period ($T_{GI}$) may be ¼ of the useful symbol time period $T_u$.

In any of the preceding aspects/embodiments, each multicarrier symbol may be generated using a N-point inverse fast Fourier transform (IFFT) with the corresponding OOK mapped data bit being modulated onto M−1 of the IFFT outputs to provide M active orthogonal sub-carriers, where M<N, and a 0 data bit being modulated onto N−M−1 of the IFFT outputs.

In any of the preceding aspects/embodiments, N may equal 64, M may equal 16, the sub-carriers may have an inter-carrier spacing (SS) of 312.5 KHz, each multicarrier symbol may have a useful symbol time period ($T_u$) of 3.2 µs, and the inserted guard interval period ($T_{GI}$) may be ¼ of the useful symbol time period $T_u$.

In any of the preceding aspects/embodiments, the method may include, at a wake up receiver, receiving the wake-up signal transmitted over the wireless channel. The method may also include down-converting the wake-up signal to recover the successive multicarrier symbols. The method may also include extracting data bits from each of the multicarrier symbols to recover the data bits of the wake-up frame.

In any of the preceding aspects/embodiments, extracting data bits from each of the multicarrier symbols may include applying an envelope detection operation to the received multicarrier symbols and applying a decision threshold to the output of envelope detection operation. Extracting data bits from each of the multicarrier symbols may be performed in the absence of channel estimation or equalization.

In any of the preceding aspects/embodiments, the decision threshold may be determined based on channel quality.

In any of the preceding aspects/embodiments, the envelope detection operation may include a low pass filter having the same number of filter coefficients as the product of a sum of the number of subcarriers in the multicarrier symbols and a ratio of the guard interval period to a useful symbol period.

In some aspects, the present disclosure describes a method of waking up a wireless receiving device having a wake-up receiver (WUR) circuit. The method includes receiving, at the WUR circuit, a wake-up signal carrying multicarrier symbols that correspond to data bits of a wake-up frame, the multicarrier symbols each comprising multiple orthogonal sub-carriers that have been modulated with the same data bit and a DC sub-carrier and that each include a guard interval period. The method also includes extracting, at the WUR circuit, data bits from the multicarrier symbols to recover the data bits of the wake-up frame. The method also includes transmitting, based on the extracted data bits, an internal wake-up signal from the WUR circuit to wake up a main receiver circuit of the wireless receiving device.

In any of the preceding aspects/embodiments, extracting the data bits may include applying an envelope detection operation to each of the multicarrier symbols and applying a decision threshold to the output of envelope detection operation.

In any of the preceding aspects/embodiments, extracting data bits from each of the multicarrier symbols may be performed in the absence of channel estimation or equalization.

In any of the preceding aspects/embodiments, the envelope detection operation may include a low pass filter having the same number of filter coefficients as the product of a sum of the number of subcarriers in the multicarrier symbols and a ratio of the guard interval period to a useful symbol period.

In any of the preceding aspects/embodiments, the decision threshold may be determined based on quality of a channel through which the wake-up signal is received.

In any of the preceding aspects/embodiments, the data bits in multicarrier symbols may be mapped using on-off keying (OOK).

In any of the preceding aspects/embodiments, the multicarrier symbols may include 16 sub-carriers having an inter-carrier spacing (SS) of 312.5 KHz, each multicarrier symbol may have a useful symbol time period ($T_u$) of 3.2 µs, and the inserted guard interval period ($T_{GI}$) may be ¼ of the useful symbol time period $T_u$.

In any of the preceding aspects/embodiments, the multicarrier symbols may include 14 sub-carriers having an inter-carrier spacing (SS) of 312.5 KHz, each multicarrier symbol may have a useful symbol time period ($T_u$) of 3.2 µs, and the inserted guard interval period ($T_{GI}$) may be ¼ of the useful symbol time period $T_u$.

In some aspects, the present disclosure describes a method of providing a wake-up signal. The method includes Manchester modulating OOK mapped data bits of a wake-up packet onto multicarrier symbols in time domain. Each multicarrier symbol includes a respective set of sub-carriers and a null sub-carrier. The method also includes up-converting the successive multicarrier symbols to a carrier frequency to provide a wake-up signal. The method also includes transmitting the wake-up signal over a wireless channel.

In any of the preceding aspects/embodiments, the multicarrier symbol may include M sub-carriers, wherein for each multicarrier symbol the corresponding data bit may be modulated as "on" and "off" periods of equal duration.

In any of the preceding aspects/embodiments, M may equal 16 and the sub-carriers may have an inter-carrier spacing (SS) of 312.5 KHz.

In some examples an access point and a wake up receiver are provided to perform any of the above methods. For example, an access point may perform any of the above-described methods of providing a wake-up signal, and a receiver station may decode the wake-up signal. In some aspects, the present disclosure describes a method of providing a low-rate data signal. The method includes receiving input data bits. The method also includes retrieving a stored waveform for coding orthogonal sub-carriers of a multicarrier symbol, the multicarrier symbol including a null sub-carrier. The method also includes Manchester modulating the input data bits onto successive multicarrier symbols in time domain. The method also includes up-converting the successive multicarrier symbols to a carrier frequency to provide the low-rate data signal. The method also includes transmitting the low-rate data signal over a wireless channel.

In any of the preceding aspects/embodiments, generation of the waveform using inverse fast Fourier transform (IFFT) may not be required for each transmission.

In any of the preceding aspects/embodiments, the method also includes generating the waveform using IFFT, and storing the waveform.

In any of the preceding aspects/embodiments, the input data bits may be mapped using on-off keying (OOK).

In any of the preceding aspects/embodiments, the multi-carrier symbol may include M orthogonal sub-carriers, wherein for each successive multicarrier symbol the corresponding data bit may be modulated onto each of M−1 of the orthogonal sub-carriers.

In any of the preceding aspects/embodiments, for each successive multicarrier symbol the corresponding data bit may be modulated as "on" and "off" periods of equal duration.

In any of the preceding aspects/embodiments, M may equal 16 and the sub-carriers may have an inter-carrier spacing (SS) of 312.5 KHz.

In any of the preceding aspects/embodiments, the method may include inserting a guard interval period into each of the successive multicarrier symbols.

In any of the preceding aspects/embodiments, the input data bits may be data bits of a wake-up packet and the low-rate data signal may be a wake-up signal.

In any of the preceding aspects/embodiments, the wake-up packet may include a short training field. The short training field may include a short training sequence enabling detection of the wake-up packet distinct from other signals.

In some aspects, the present disclosure describes a method at a receiver. The method includes receiving a low-rate data signal transmitted over a wireless channel. The method also includes down-converting the low-rate data signal to recover successive multicarrier symbols, each multicarrier symbol comprising a set of orthogonal sub-carriers and a null sub-carrier. The method also includes extracting data bits from each of the multicarrier symbols to recover the data bits of the low-rate data.

In any of the preceding aspects/embodiments, extracting data bits may include, for each received multicarrier symbol: applying an envelope detection operation to the received multicarrier symbol; and applying a decision threshold to the output of envelope detection operation.

In any of the preceding aspects/embodiments, extracting data bits may includes, for each received multicarrier symbol: measuring power distribution of the received multicarrier symbol; and comparing power distribution between first and second halves of the received multicarrier symbol and determining the corresponding data bit to be a "1" or a "0" based on the comparison.

In some aspects disclosed herein, a receiver may be configured to receive a wake-up signal produced by any of the methods described above. The receiver may be configured to determine power distribution in received symbols contained within the wake-up signal and determine if the received symbols correspond to zeros or ones based thereon.

BRIEF DESCRIPTION OF THE DRAWINGS

Reference will now be made, by way of example, to the accompanying drawings which show example embodiments of the present application, and in which:

FIGS. 16 and 17 respectively show frequency domain power distribution for "1" and "0" sub-symbols for an example third case;

Similar reference numerals may have been used in different figures to denote similar components.

DESCRIPTION OF EXAMPLE EMBODIMENTS

An electronic device (ED) such as a user device or station, such as a machine type device or sensor device that is intended to operate in a wireless network such as a wireless local area network (WLAN), may have a separate low-power wake-up receiver (WUR) circuit in addition to a higher power WLAN receiver circuit. The WUR receiver circuit is generally a low-power receiver circuit (typically, a simplified or reduced version of the main wireless receiver circuit) designed for receiving and detecting a wake-up signal. The WUR circuit communicates with the WLAN receiver circuit, or other equivalent circuit, of the device, so the WLAN receiver circuit may sleep and conserve power until the WUR circuit wakes up the WLAN receiver circuit. The WUR circuit wakes up the WLAN receiver circuit, or other equivalent circuit, when the WUR circuit detects a wake-up signal from an AP (typically, the AP associated with the WLAN device).

A suitable wake-up frame (WUF) design is described herein for communicating wake-up signals to the WUR circuit. The present description describes example embodiments of a WUF, including description of example of the WUF frame format, examples of the WUF preamble, and examples of the WUF short training field (STF).

A WUR circuit is designed to have low power consumption. Thus, there is a need for a transmitted wake up signal that can be detected by a WUR using a simple detection algorithm. Accordingly, example embodiments are directed to a system and methods that use a wake up radio frame with an orthogonal frequency-division multiplexed (OFDM) based and OOK (On-Off Keying) modulated waveform design for a WUR, which can be detected using only envelope detection without channel estimation and equalization.

Example embodiments described herein may be implemented using IEEE 802.11 technology.

Figure 1:
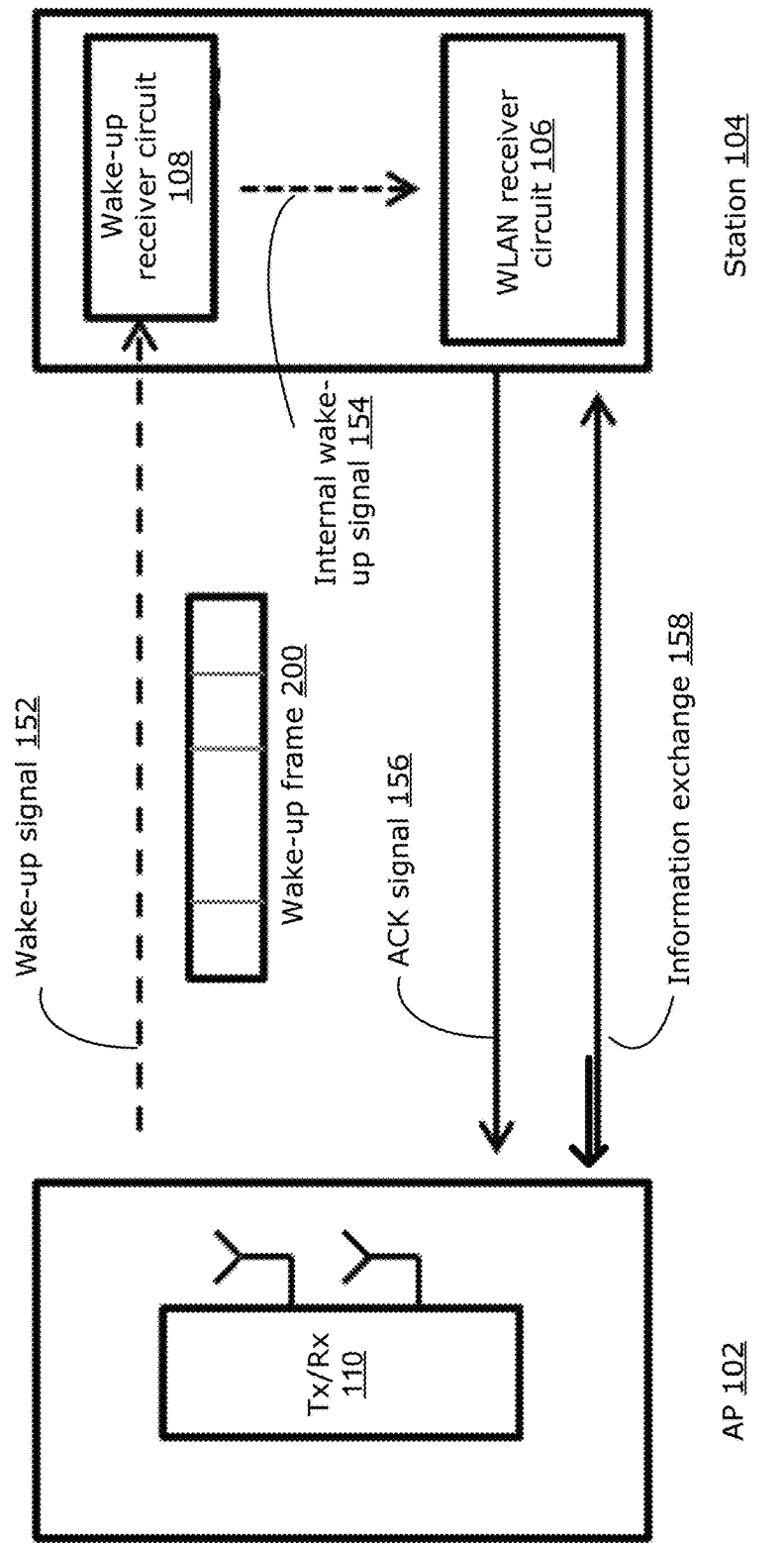
FIG. 1 is a block diagram illustrating communications between an AP and an example station having a wake-up receiver circuit.

FIG. 1 is a schematic diagram illustrating an example AP 102 and an example station 104 (e.g., a low duty cycle WLAN device or other ED) associated with the AP 102. The example station 104 includes a WLAN receiver circuit 106 (e.g., a Wi-Fi receiver) and a WUR circuit 108 (also referred to simply as a WUR). In some examples, the WLAN receiver circuit 106 may be a transceiver circuit. The AP 102 includes WLAN transceiver circuit 110.

FIG. 1 illustrates a set of example signals that may be communicated for waking up a sleeping WLAN receiver circuit 106. The AP 102 may send a wake-up signal 152, carrying a WUF 200 (described further below) to the station 104. The WUF 200 is detected by the WUR circuit 108, and the WUR circuit 108 sends an internal wake-up signal 154 to the WLAN receiver circuit 106, waking up the WLAN receiver circuit 106 if the WLAN receiver circuit 106 is in sleep mode. The WLAN receiver circuit 106 then sends an ACK signal 156 back to the AP 102. Appropriate information exchange 158 between the AP 102 and the station 104 (via the WLAN receiver circuit 106) may then take place. After the information exchange 158 is finished, the WLAN receiver circuit 106 may return to the sleep state. The wake-up signal 152, internal ACK signal 156 and information exchange 158 may all be communicated over the same channel. In some examples, the wake-up signal 152 is communicated using a multicarrier based waveform.

Although FIG. 1 shows the wakeup signal 152 being communicated to a WUR circuit 108 that is associated with a WLAN receiver circuit 106, the processes and systems described in the present disclosure may be applicable to other circuits, including other wireless receiver circuits, which may benefit from a wake-up mechanism.

Example embodiments of the WUF 200 are now described in further detail. Generally, the WUF 200 can be designed independently of the communications between the WLAN receiver circuit 106 and the AP 102. Accordingly, any suitable waveform technology may be used for the design of the WUF frame format. Generally, because the WUF 200 is intended to be a low-power signal, a shorter frame length is more suitable. The WUF 200 may include a legacy preamble. The non-legacy portions of the WUF 200 may be referred to as the wake-up portion or wake-up packet (WUP). In an example, the total WUP is about 30 to 60 bytes long from the preamble to the frame check sequence (FCS), although the WUP may be longer or shorter than this range in other examples. In some examples, the WUP may use the 20 MHz bandwidth (BW), similarly to the legacy preamble, however other examples may use a different BW, such as a smaller BW than 20 MHz.

Using a single carrier (SC) for the WUF 200 may require a WUP having frame length longer in time in order to accommodate 30 to 60 bytes. Instead, orthogonal frequency-division multiplexing (OFDM) may be used for the WUF 200. Using OFDM, the frame length can be shortened compared with implementations using the SC waveform. Using the same OFDM technology for both the WUF 200 and other WLAN communications may help to reduce the implementation cost by allowing reuse of pre-existing WLAN implementation on the station 104.

Example embodiments described herein use the OFDM technology for coding the WUF 200. In some applications, the use of OFDM for wake-up signal 152 may allow a shorter frame length to be used as when compared to a single-carrier-based modulation. Furthermore, using a similar OFDM technology for both the WUF 200 and other WLAN communications may help reduce implementation costs by allowing reuse of pre-existing WLAN implementation on the station 104.

Figure 2:
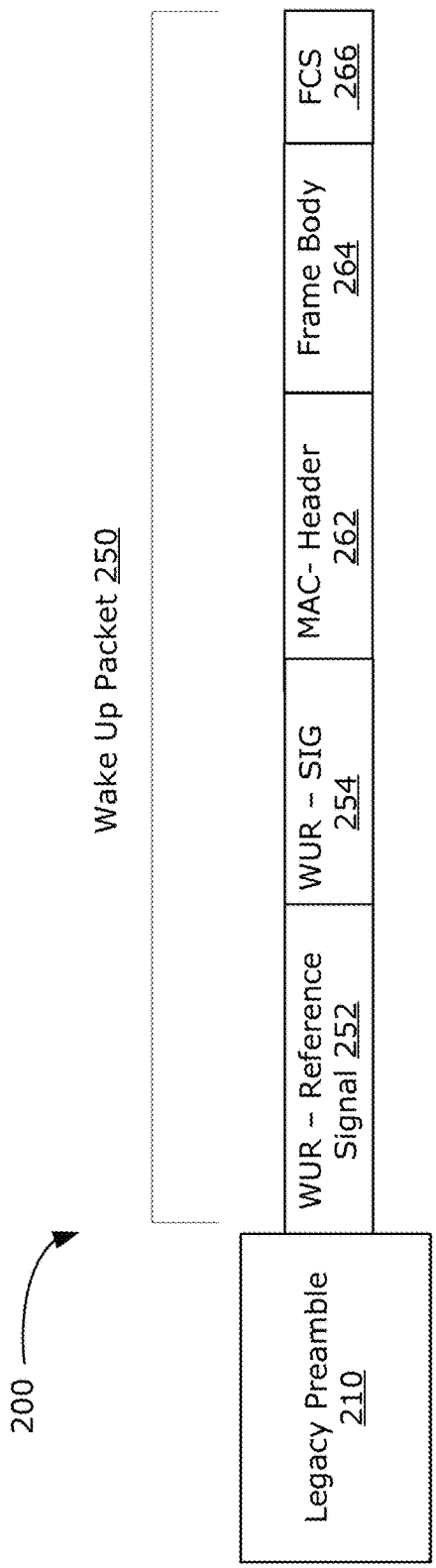
FIG. 2 illustrates an example frame format for an example wake-up frame.

An example frame format for an example WUF 200 is shown in FIG. 2. The heights of the various blocks shown in FIG. 2 illustrate the relative BWs of each portion. In the example of FIG. 2, the WUF 200 includes a legacy preamble 210 pre-pended to a wake-up portion or packet (WUP) 250. The WUP 250 includes a WUR—Reference Signal field 252, a WUR signal (SIG) field 254, a MAC header 262, a frame body 264 and a frame check sequence (FCS) 266. The MAC header 262, frame body 264 and FCS 266 may together be referred to as the payload of the WUP 250.

The legacy preamble 210 serves to silence all non-destination WLAN devices during the transmission of the WUF 200. The legacy preamble 210 may include a legacy short training field (L-STF), a legacy long training field (L-LTF), and a legacy signal (L-SIG) field. The legacy preamble 210 is generally 20 MHz wide in BW, in accordance with legacy standards. In the example of FIG. 2, the WUP 250 is illustrated as being narrower in BW than the legacy preamble 210, for example the WUP 250 may be 5 MHz in BW, although other BW may also be suitable (e.g., 1.25 MHz). In other examples discussed further below, the WUP 250 may have the same BW as the legacy preamble 210. The legacy preamble 210 is used for coexistence with other IEEE 802.11 devices, however in some examples the legacy preamble 210 may be omitted, as discussed further below.

The WUR-Reference Signal field 252 is provided for packet detection, synchronization and channel estimation purposes. In some examples, WUR-Reference signal may include a short training field (STF) and a long training field (LTF) that can be used by the WUR 108 to detect the WUP 250 as distinct from other frames. In some examples, the WUR 108 may not need any addition information beyond what is contained in the WUR-Reference Signal field 252, enabling the wake-up-frame 200 to be short in length and thus requiring less power by the WUR108 to process the wake-up-frame 200. However, in other embodiments additional information contained in the further fields of the WUP 250 may be used to enable a higher degree of functionality at WUR 108.

For example, additional controlling information from the AP 102 may be provided in the WUR-SIG field 254 and/or the MAC header 262. Other information may be carried in the frame body 264. Examples are described in U.S. provisional application No. 62/362,473, titled "MAC Frame Design of Wake-Up Frame for Wake-Up Receiver", filed Jul. 14, 2016.

In example embodiments a OFDM based waveform is used for WUP 250, with the resulting waveform having a bandwidth less than 20 MHz. OFDM waveforms are typically defined by a set of numerology attributes including subcarrier or tone spacing (SS); number of subcarriers or tones (M); and cyclic prefix or guard interval length ($T_{GI}$). Different numerologies can be used in different embodiments however one example numerology set that may be used is: Total number of subcarriers M=16 (including one DC null subcarrier); subcarrier spacing SS=312.5 KHz; $T_{GI}=¼$ of the useful symbol time period $T_u$; useful symbol time period $T_u=3.2$ μs; and total symbol period $T_{tot}=4$ μs. With M=16 and SS=312.5 Khz, the resulting signal bandwidth is 5 MHz. It will be recognized that this numerology is similar to that of the IEEE 802.11a standard, although with a reduced set of subcarriers, which can allow reuse of some circuit design aspects that have been established for IEEE 802.11a. The sub-carriers are orthogonal as the inter subcarrier spacing SS is the inverse of the useful symbol length $T_u$.

Figure 3:
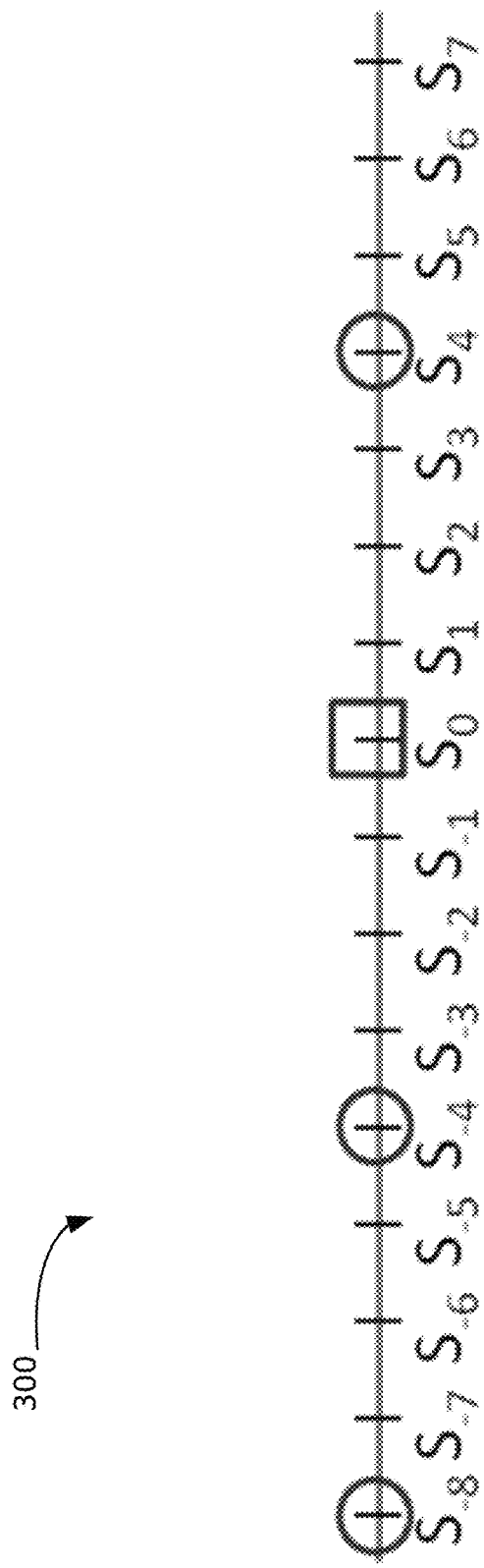
FIG. 3 illustrates positions for non-zero values in an example short training sequence.

FIG. 3 is a schematic of an example sequence, representing the 16 tones of the OFDM symbol, and illustrating example positions for non-zero values in a short training sequence (STS) carried in the WUR-Reference Signal field 252. The example of FIG. 3 uses the WLAN sub-carrier spacing of 312.5 KHz for the WUP 250 and with a symbol length of 3.2 μs, resulting in 16 tones per 5 MHz. In the example of FIG. 3, there is one DC null tone and 15 data tones for the numerology of the WUP 250. There are no Edge tones in the OFDM symbol of the WUP 250.

FIG. 3 illustrates the DC null tone (designated by a square) at $S_0$. The positions of the non-zero values for the STS are designated by circles at $S_{-8}$, $S_{-4}$, and $S_4$. The positions of the non-zero values in the STS are fixed, although the actual values of the non-zero values may be varied. In the present disclosure, $S_{-8,7}$ means tones $S_{-8}$ to $S_7$.

As noted above, the WUR-Reference Signal field 252 may include a STF or LTF (also referred to as WUR-STF and WUR-LFT, respectively) that may be used by the WUR 108 for WUP 250 detection. Additionally, the STF or LTF of the WUR-Reference Signal field 252 may be used for coarse frequency offset compensation and automatic gain control (AGC), similarly to the L-STF. The example of FIG. 3 includes the same four periodicities of an OFDM symbol, resulting in a total of five periodicities in the STS when the guard interval (GI) is pre-pended to a symbol. A GI of 0.8 μs may be used, for example. In some examples, the STF or LTF of the WUR-Reference Signal field 252 may include two consecutive STSs with the GI pre-pended to each STF (e.g., similarly to IEEE 802.11 L-STF), but it is not limited to two consecutive STF symbols. In the example of a WUR-Reference Signal field 252 with two consecutive STSs, and including the GI in each STF, the result is ten periodicities in total.

In an example embodiment, the sequence for one STS in the WUR-Reference Signal field 252 may be $$S_{-8,7} = \left\{ \frac{1+j}{\sqrt{2}}, 0, 0, 0, \frac{1+j}{\sqrt{2}}, 0, 0, 0, 0, 0, 0, 0, \frac{-1-j}{\sqrt{2}}, 0, 0, 0 \right\}.$$

However, as noted above, other non-zero values may be used.

The AP 102 may use filtered OFDM (f-OFDM) technology to filter the 16 tones during baseband processing. For example, the 16 tones of data may be filtered with the 5 MHz pass-band using the f-OFDM under the 20 MHz transmitter spectral mask, where the WUP 250 has a 5 MHz BW.

The STS are then transformed into the time-domain signal and received by the WUR circuit 108 in the time-domain. The WUR circuit 108 then performs auto-correlation or cross-correlation on the received signal. In the example where the WUP 250 has a 5 MHz BW, the WUR circuit 108 receives the WUP 250 with the 5 MHz receiver filter in the RF. Although the legacy preamble 210 also contains L-STF, this will be filtered out by the WUR circuit 108 where the WUR circuit 108 is designed to detect a WUP 250 of narrower bandwidth. Hence, the legacy preamble 210 is not expected to interfere with detection of the WUP 250 by the WUR circuit 108. Furthermore, the number of samples in each period of the WUR-STF in the WUR-Reference Signal field 252 is four, whereas the number of samples in each period of L-STF is 16. Hence, the presence of L-STF is not expected to affect detection of the WUP 250 after the auto-correlation or cross-correlation is done.

In the case where cross-correlation is performed, when the WUR circuit 108 detects 2-3 peaks per one STF or 7-8 peaks per two consecutive symbols after the correlation, the WUR circuit 108 determines that the WUP 250 is detected. The coarse frequency offset estimation may then be done with the following 2-3 peaks in a series of periodicities.

In case where auto-correlation is performed, when the WUR circuit 108 detects a certain set of samples exceeding the preset threshold after the correlation, the WUR circuit 108 determines that the WUP 250 is detected. The coarse frequency offset estimation may then be done with the best sample among the samples exceeding the preset threshold.

Figure 4:
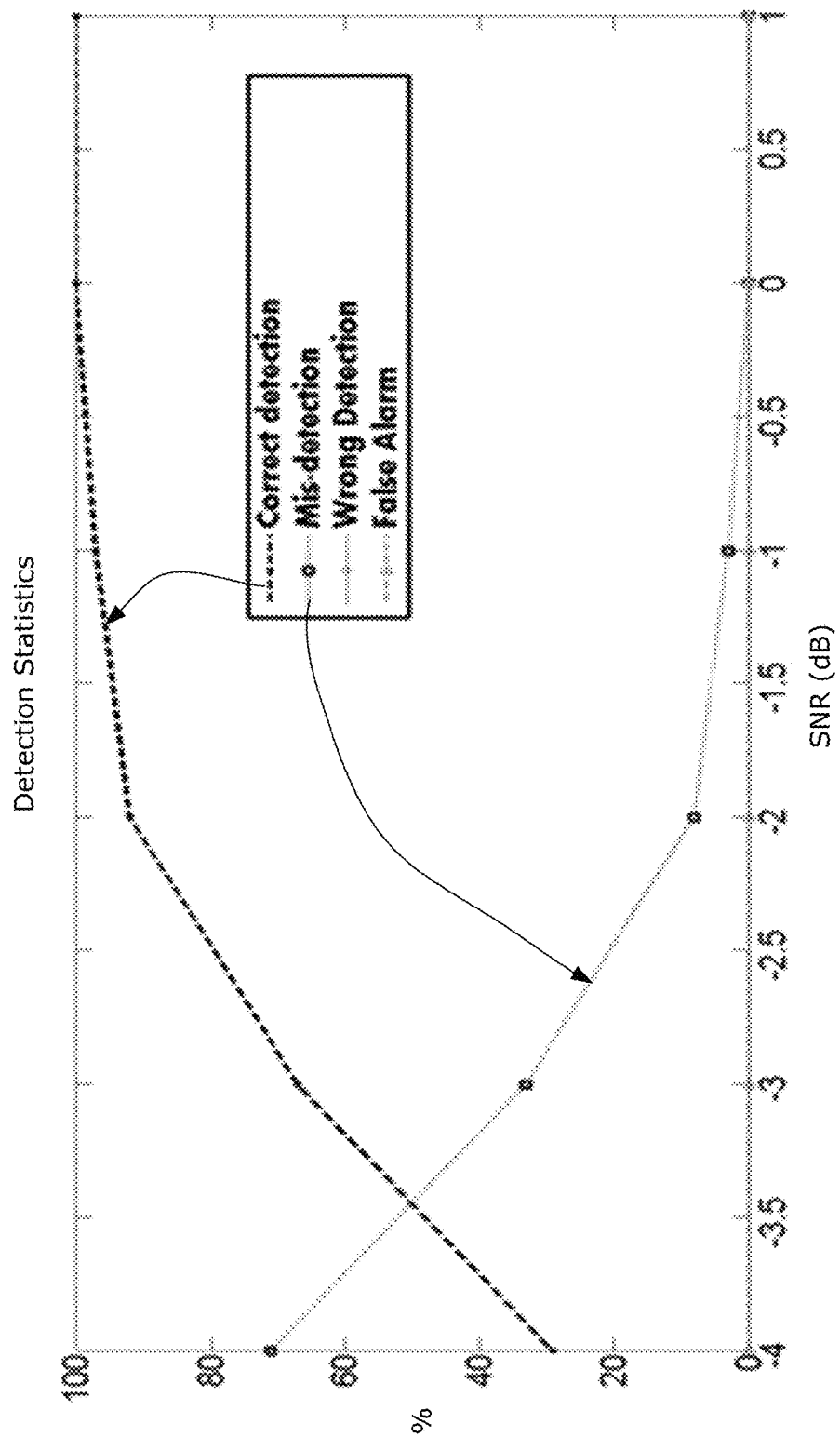
FIG. 4 is a chart showing detection statistics for an example wake-up frame.

FIG. 4 shows detection statistics for an example WUP 250 using the example WUR-STF described above. In this chart, correct detection refers to when the WUR circuit 108 correctly detects the WUP 250 using the WUR-STF; misdetection refers to when the WUR circuit 108 fails to detect the WUP 250 from the WUR-STF; wrong detection refers to when the WUR circuit 108 falsely detects a WUP 250 based on the L-STF (that is, the WUR circuit 108 mistakes the L-STF to be the WUR-STF); and false alarm refers to when the WUR circuit 108 falsely detects a WUP 250 when no signal is transmitted. In the example results illustrated in FIG. 4, the plots for wrong detection and for false alarm are zero for all SNR. Thus, using the example WUR-STF described above results in zero wrong detection, indicating that the presence of the L-STF does not inhibit the WUR circuit 108 from detecting the WUR-STF. For these example detection statistics, an auto-correlation with the 4-sample period was run for the packet detection, and the threshold for the detection was set to the 0 dB. The channel is the additive white Gaussian noise (AWGN) channel.

Figure 5:
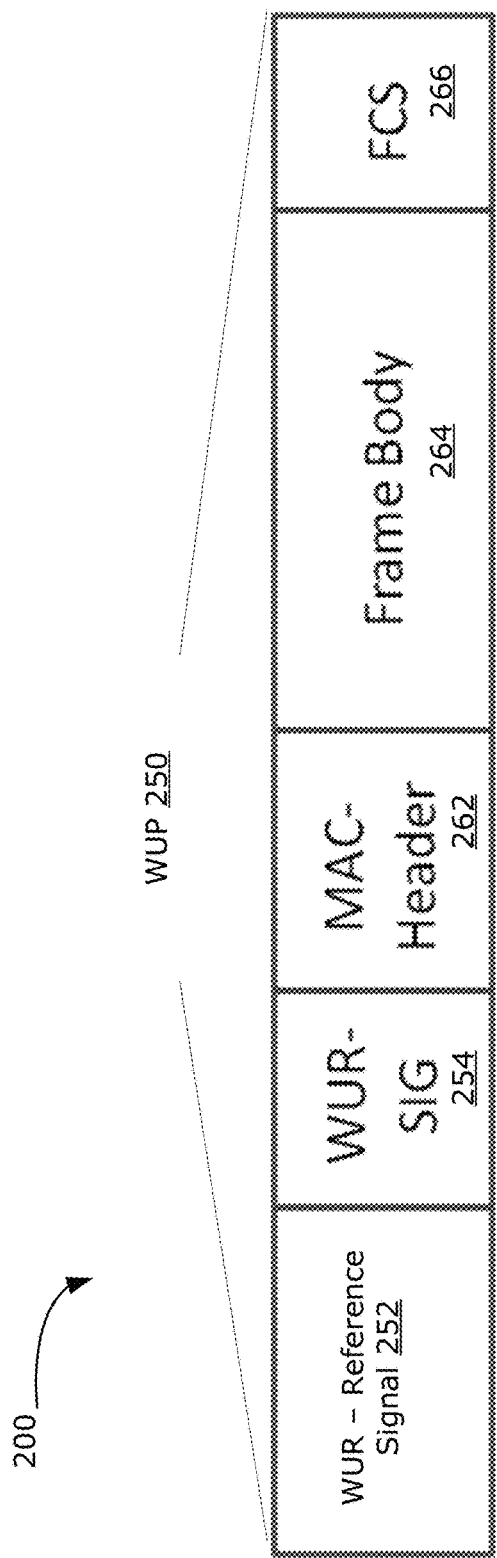
FIG. 5 illustrates another example frame format for an example wake-up frame.

In some examples, the WUF 200 may be transmitted without a legacy preamble 210. FIG. 5 shows an example frame format for a WUF 200 with no legacy preamble. The WUP 250 and its WUR-Reference Signal field 252 may otherwise be similar to that described above with respect to FIGS. 2-4. A WUF 200 having such a frame format may be referred to as a Greenfield WUF. The Greenfield WUF may not be compatible with legacy devices, and may result in a collision situation. A collision situation may require the AP 102 to retransmit the signal.

In other examples, the WUR circuit 108 may be capable of receiving and detecting legacy signals (e.g., 20 MHz signals). In such examples, the WUR circuit 108 may be able to detect the legacy preamble 210 included in the frame format shown in FIG. 2. Accordingly, information detectable by the WUR circuit 108, such as length information, may be encoded using the legacy signal (L-SIG) field in the legacy preamble 210. For example, the L-SIG field may include extra unused bits, and controlling information for the WUR circuit 108 may be carried in these extra bits instead of in the WUP 250. This may enable further shortening of the WUP 250. Further, this may allow for more urgent information to be located earlier within the frame and hence decoded earlier by the WUR circuit 108.

Where the WUR circuit 108 is capable of detecting legacy signals, the WUP 250 may be transmitted using the same BW (e.g., 20 MHz) as legacy signals.

In some examples, the WUP 250 may use a 1.25 MHz BW. This may be suitable where the WUP 250 is designed to keep the same sub-carrier spacing as the IEEE 802.11ax format, specifically 78.125 KHz, while using 16 tones per OFDM symbol (including one DC null tone and 15 data tones, as described above) and using the same location for the Short Training Sequences as described above. The f-OFDM can be applied similarly as described above with respect to a 5 MHz WUP 250, however a 1.25 MHz BW filter will be applied in the baseband, instead.

Regardless of the BW of the WUP 250, the legacy preamble 210 may or may not be pre-pended to the WUP 250.

In some examples, f-OFDM technology may be used to transmit the 5 MHz WUP 250 through the 20 MHz transmitter filter. The f-OFDM provides the baseband filtering, which enable omission of the extra 5 MHz transmitter filter. As well, the f-OFDM enables the AP 102 to schedule transmission to the 802.11ax devices together with the WUF 200. Similarly, in examples where the WUP 250 has a 1.25 MHz BW, f-OFDM technology may be used to transmit the WUP 250 through the 20 MHz transmitter filter.

The different numerology of OFDM symbols of the WUP 250 may be transmitted together with the IEEE 802.11ax orthogonal frequency-divisional multiple access (OFDMA) scheduled Resource Units (RU) (e.g., within a IEEE 802.11ax Multi User-Physical layer Protocol Data Unit (MU-PPDU)) when the WUP 250 is filtered with the 5 MHz f-OFDM filter in the baseband.

Multiple WUFs 200 may also be transmitted simultaneously using the f-OFDM technology. For example, multiple WUFs 200 having 5 MHz wide WUPs 250 may be f-OFDM filtered and transmitted together with the center frequency of each WUP 250 being 5 MHz apart among each other. The same principle can be applied for a WUP 250 having a 1.25 MHz BW.

Figure 6:
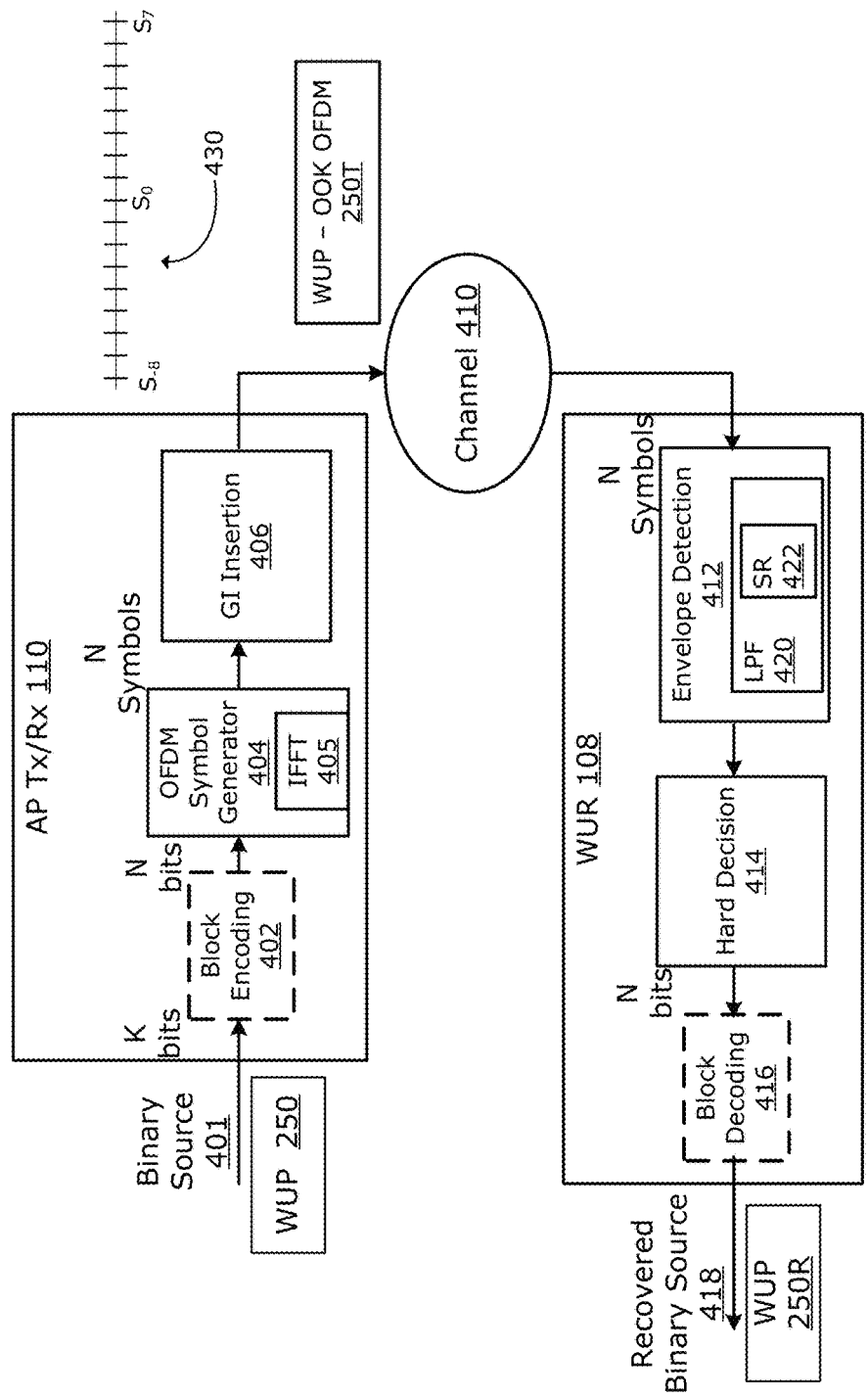
FIG. 6 is a block diagram illustrating an ODFM system.

FIG. 6 is a basic system block diagram illustrating an example OFDM based system. In particular, FIG. 6 shows the process flow applied at the AP transceiver 110 and the WUR circuit 108 to a WUP 250. Although described in the context of a WUP 250, the OFDM-based system and the process described below may be used for any suitable low-rate data. In some examples, each processing block 412, 414, 416 shown as being performed at WUR circuit 108 represents an operation that may be implemented as a module or element that is part of a common integrated circuit. Similarly, each processing block 402, 404, 406 shown as being performed at AP transceiver 110 represents an operation that may for example be implemented as a module or element of a common integrated circuit.

As shown in FIG. 6, a WUP 250 is provided as a binary source input 401 to the AP transceiver 110. In some examples, the binary source input 401 is mapped using on-off keying (OOK). In some examples, block encoding to apply error correction and/or compress data (e.g. encoding K bits to N bit codewords) can be applied to the binary source input 401 by a block encoding operation 402, however such encoding is optional.

An OFDM symbol generation operation 404 is then performed on the OOK mapped data bits to generate corresponding OFDM based symbols. In some examples, each data bit is represented by a single OFDM based symbol (e.g., as described above with respect to FIG. 3) such that N data bits results in N successive symbols. Thus, for each symbol, the OFDM symbol generator 404 is used to modulate the same data bit across all of the orthogonal subcarriers of the corresponding OFDM symbol (represented by item 430 in FIG. 6). In an example using the numerology parameters set out above, the OFDM symbol 430 includes M=16 subcarriers $S_{-8}$ to $S_7$, having subcarrier spacing SS=312.5 KHz, with one of the central subcarriers (for example $S_o$) used as a DC null tone and the remaining 15 subcarriers (for example $S_{-8}$ to $S_{-1}$ and $S_1$ to $S_7$) each being modulated with the same data bit. Thus, in such an example the three successive data bits 1,0,1 would have the three corresponding OFDM symbols:

First data bit 1=>Symbol 430(1): $S_{-8,7}$={1,1,1,1,1,1,1,1,DC,1,1,1,1,1,1,1}
Second data bit 0=>Symbol 430(2): $S_{-8,7}$={0,0,0,0,0,0,0,0,DC,0,0,0,0,0,0,0}
Third data bit 1=>Symbol 430(3): $S_{-8,7}$={1,1,1,1,1,1,1,1,DC,1,1,1,1,1,1,1}

In the example described above where M=16, OFDM symbol generation operation uses a 16 point inverse fast Fourier transform (IFFT) 405 to generate OFDM symbols 430. Using the above waveform numerology example, the bandwidth of OFDM symbols 430 is 5 MHz.

Guard interval insertion into the OFDM symbol 430 occurs at GI insertion operation 406. In the example numerology set out above, $T_{GI}$=¼ of the useful symbol time period (also referred to as the IFFT time period). The OFDM symbols 430 are then up-converted to a channel carrier frequency and transmitted through wireless network channel 410. In some examples, the same transmit filter used for IEEE 802.11 is used to provide spectral filtering to ensure that the transmitted OFDM symbols, including any edge tones beyond the M subcarriers, fall within a 20 MHz spectral mask.

Accordingly, the AP transceiver 110 encodes the data contained in WUP 250 and transmits, via channel 410, a corresponding OOK-mapped, OFDM-based WUP signal 250T, in which each data bit from the original source WUP 250 is encoded as a single OFDM symbol.

At the WUR 108, the OFDM-based WUP signal 250T is received and down-converted to baseband. Envelope detection operation 412 and hard decision operation 414 are then used to extract the N bits that correspond to the WUP 250 from the N symbols contained in the down converted signal. In some examples, the design of the OFDM based WUP signal is such that envelope detection can be accurately performed at the WUR 108 without any need to perform channel estimation or equalization. The WUR 108 does not operate as a conventional OFDM receiver as it does not include GI removal and FFT processing—rather, WUR 108 relies on envelope detection and/or hard decision operations 412, 414 to recover WUP data bits. In this regard, envelope detection operation 412 relies on a low pass filter (LPF) 420 having a set of shift registers 422. In some examples, the number of coefficients (also referred to as taps) for the low pass filter is selected to be equal to the number of active subcarriers multiplied by the guard interval to useful symbol time ratio ($T_{GI}/T_u$). For example, using the numerology described above where M=16 and $T_{GI}$=¼ of useful symbol time, the number of LPF coefficients would be 4. The shift registers 422 are each initialized with predetermined values that are specifically selected to be different than the incoming symbols.

The hard decision operation 414 is configured to apply a decision threshold level to the output of envelope detection operation 412 to determine a "0" or "1" bit output. In some examples, the threshold applied by the hard decision operation 414 may be set depending on the quality of the channel 410 between the AP transceiver 110 and WUR 108. In some applications, the decision threshold maybe set at the time that the station 104 that contains the WUR 108 is initialized, and in some applications WUR 108 may be configured to continuously or periodically monitor channel quality and adaptively change the threshold applied by the hard decision operation 414 in dependence on the monitored channel quality. In some examples, a channel quality maybe determined based on a channel a signal-to-noise ratio or as a function of the modulation and coding system (MCS) between the source and the receiver.

The N-bit output of the hard decision operation 414 provides the recovered WUP 250R (with an intermediate block decoding operation 416 being applied in the event that block encoding occurred at AP transceiver 110). The recovered WUP 250R may for example contain information and instructions for internal wake-up signal 154 for the main WLAN receiver circuit 106.

It will be appreciated from the above description that in at least some configurations an OOK-mapped, OFDM-based WUP signal may enable a low-power, simplified WUR 108 to be implemented.

As indicated above, in different embodiments different waveform numerology can be applied at the AP transceiver 110. In this regard, in some examples the system may be configured to make use of existing IEEE 802.11a numerology but to use only a subset of the 64 available subcarriers, such that the numerology parameters would be: number of available subcarriers is 64, but only middle M subcarriers are used, where M=14 (including one DC null subcarrier); subcarrier spacing SS=312.5 KHz; $T_{GI}$=¼ of the useful symbol time period $T_u$; useful symbol time period $T_u$=3.2 µs; and total symbol period $T_{tot}$=4 µs. With M=14 and SS=312.5 Khz, the resulting signal bandwidth is 4.375 MHz. In such an example, 13 out of 14 subcarriers of the OFDM symbol would be modulated with the same OOK-mapped data bit (with a central subcarrier being the DC null), and the remaining 50 subcarriers being set to zero.

Thus, in such an example the three successive data bits 1,0,1 would have the three corresponding OFDM symbols:
First data bit 1=>: $S_{-7,6}$={1,1,1,1,1,1,1,DC,1,1,1,1,1,1}; $S_{-32,-8}$ and $S_{7,31}$ all=0
Second data bit 0=>$S_{-7,6}$={0,0,0,0,0,0,0,DC,0,0,0,0,0,0}; $S_{-32,-8}$ and $S_{7,31}$ all=0
Third data bit 1=>$S_{-7,6}$={1,1,1,1,1,1,1,DC,1,1,1,1,1,1}; $S_{-32,-8}$ and $S_{7,31}$ all=0

Figure 7:
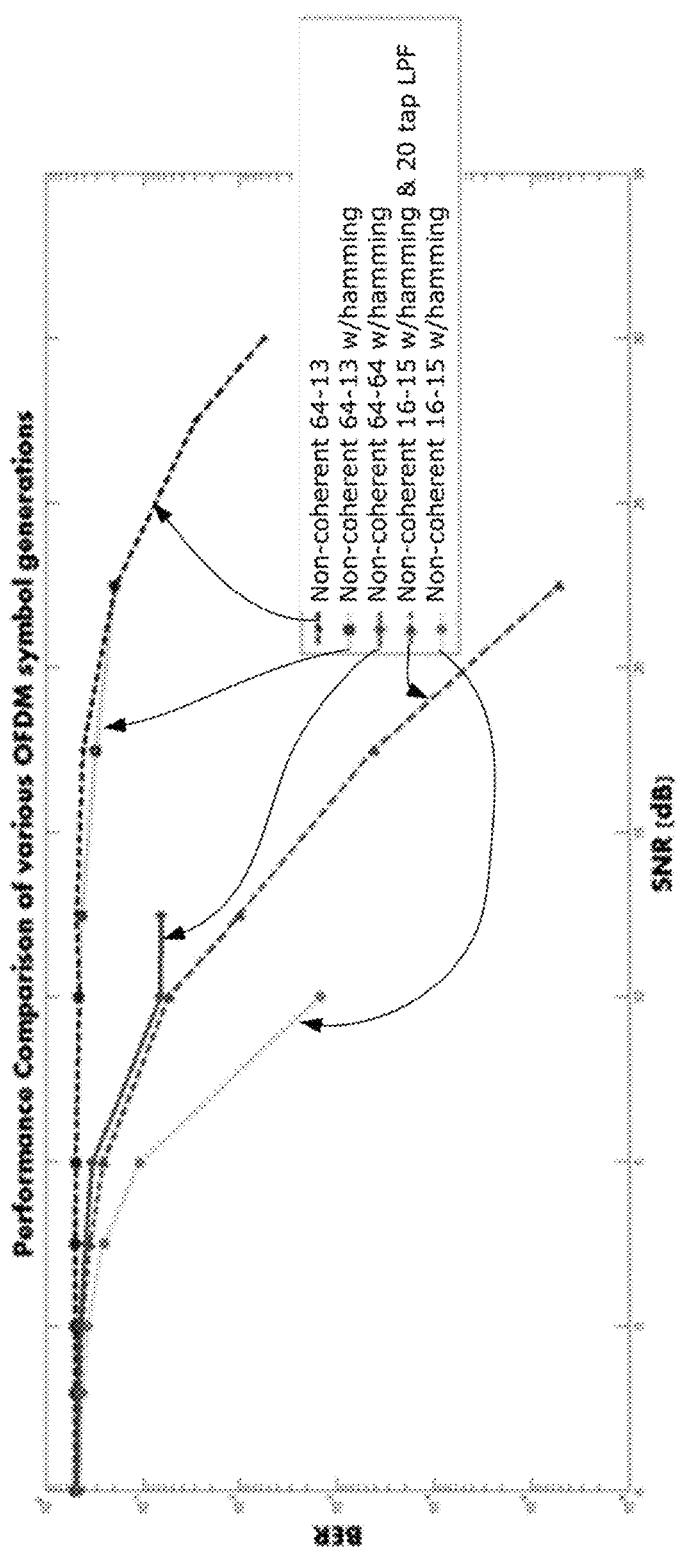
FIG. 7 is a chart showing a bit error rate (BER) performance comparison of various OFDM signals.
Figure 8:
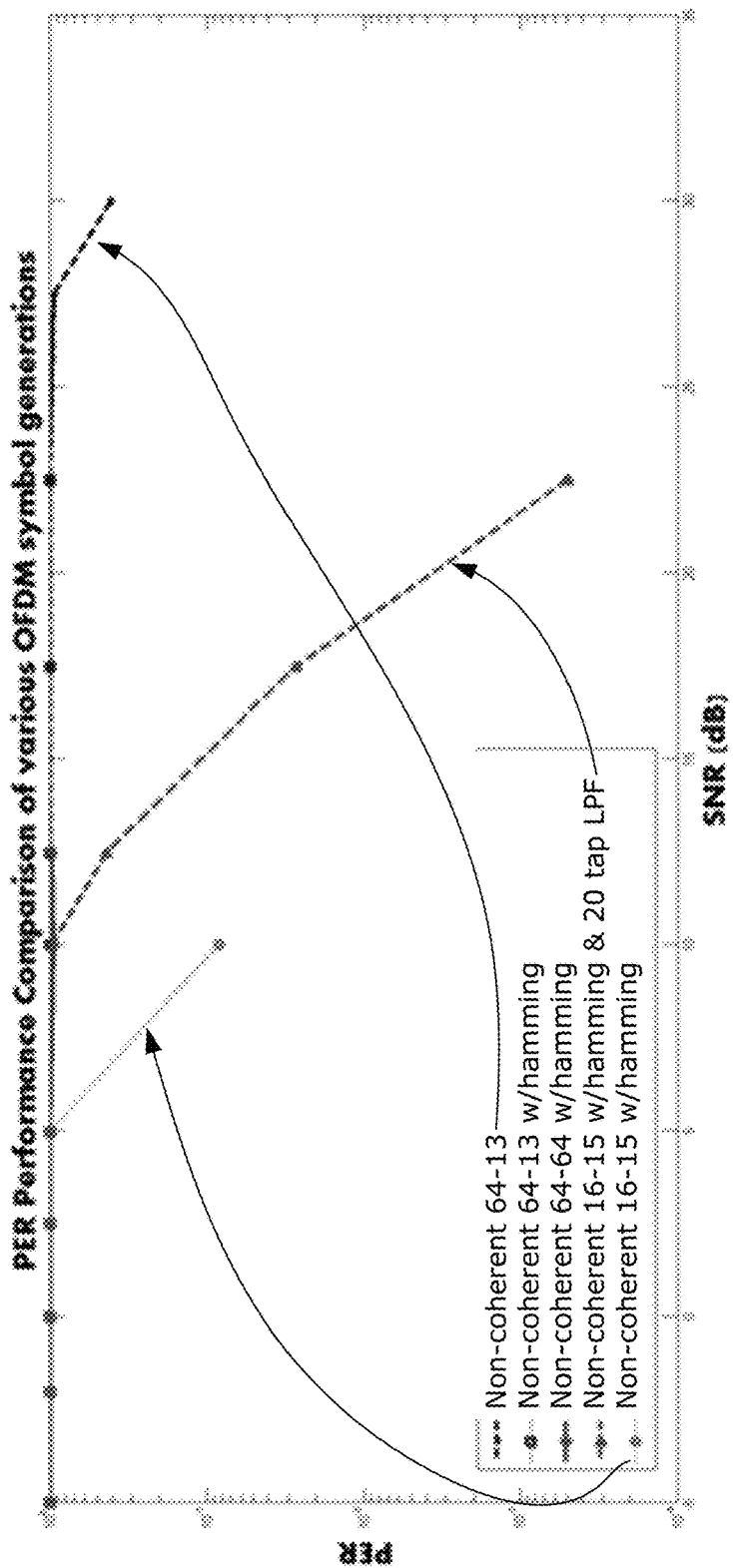
FIG. 8 is a chart showing a packet error rate (PER) performance comparison of various OFDM signals.

FIGS. 7 and 8 show simulated performance comparisons for various OFDM based symbol configurations in the context of the system of FIG. 6. Bit Error Rate (BER) and Packet Error Rate (PER) are respectively illustrated in FIGS. 7 and 8. In FIG. 8, the plots for non-coherent 64-13 w/hamming and non-coherent 64-64 w/hamming are substantially one for all SNR.

In the examples represented by FIGS. 7 and 8, all the detection methods are non-coherent envelop detection, without channel estimation or equalization. In the simulation, a WUP length of 96 bits was used. The labels in FIGS. 7 and 8 identify the number of available subcarriers and the number of tones used, excluding the DC null (ex 64-13), and if Hamming codes were used (w/hamming). The length of the WUP was 96 bits. As indicated, one OFDM symbol was tested without Hamming codes. When applied, the Hamming code used 7 coded bits, 4 information bits with one bit correction capability.

As shown in FIGS. 7 and 8, the 64 tone OFDM symbol with only 13 tones occupied with repeated input bits (non-coherent 64-13) shows almost the same performance as the same OFDM symbol with the (7,4) Hamming codes (non-coherent 64-13 w/hamming), except for the SNR range between 23 dB and 30 dB. The performance of 64 tone OFDM symbol with all 64 tones occupied by the repeated input bits (non-coherent 64-64 w/hamming) excluding 1 DC and 7 edge tones shows about 15 dB better performance than the non-coherent 64-13 w/hamming OFDM symbol.

The effect of increasing the number of taps was also considered. The OFDM scheme first discussed above, namely 16 tone OFDM symbol with 15 tones occupied with repeated input bits (non-coherent 16-15 w/hamming) and an LPF filter with 4 taps was compared to a 16 tone OFDM symbol with 15 tones occupied and with the number of taps increased to 20. As seen in FIGS. 7 and 8, increasing the number of taps to 20 was not found to improve performance, and in fact was found to provide sub-optimal performance as seen in non-coherent 16-15 w/hamming & 20 tap LPF curve.

An OFDM based and OOK (On-Off Keying) modulated waveform design for a WUR has been described by Minyoung Park, et al. "16/0341r0, LP-WUR (Low-Power Wake-Up Receiver) Follow-Up", IEEE 802.11 LRLP TIG, March 2016, where only 13 sub-carriers out of 64 sub-carriers are occupied for a data 1 case, and all 64 sub-carriers are assigned to zero for a data 0 case. However, the no energy transmission condition associated with consecutive data OFF symbols (data 0) case can result in a coexistence issue with some IEEE 802.11 compatible devices (and possibly 802.11 non-compatible devices) as a result. Eunsung Park, et al. "16/1144r0, Further Investigation on WUR Performance", IEEE 802.11 WUR SG, September 2016 describes using Manchester coding to remedy the problem caused by the no energy transmission condition. However, in at least some simulations, it has been observed that extra waveform coding such as Manchester coding can agitate the signal within the original BW such that the WUR frame cannot be detected correctly by a WUR that has an RF filter with a certain bandwidth installed.

Accordingly, some examples are disclosed herein for a WUR frame configuration that mitigates bandwidth agitation when a waveform coding is applied. In some examples, Manchester coding is applied in the time domain to the OOK data in the context of the OFDM waveform described above, namely a waveform having the numerology attribute set of: total number of subcarriers M=16 (including one DC null subcarrier, leaving 15 available subcarriers); subcarrier spacing SS=312.5 KHz; $T_{GI}$=¼ of the useful symbol time period $T_u$; useful symbol time period $T_u$=3.2 µs; and total symbol period $T_{tot}$=4 µs. With M=16 and SS=312.5 KHz, the resulting signal bandwidth is 5 MHz.

Figure 9:
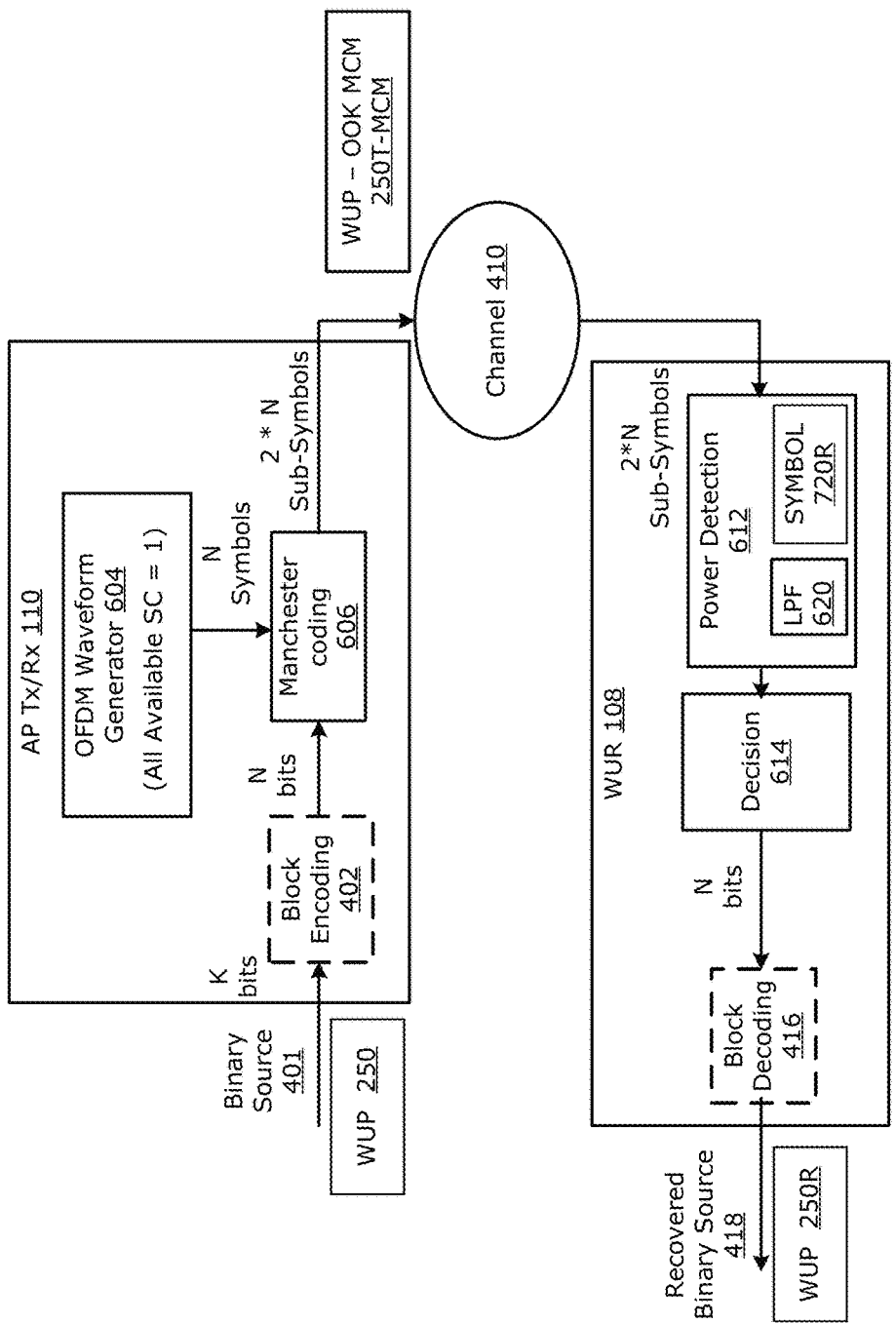
FIG. 9 is a block diagram illustrating OFDM-based waveform generation and Manchester coding.

FIG. 9 is a basic system block diagram illustrating an example OFDM-based multicarrier modulated (MCM) system that employs Manchester encoding of OOK-based data. FIG. 9 may be implemented as an alternative to the example illustrated in FIG. 6. Although described in the context of OOK-mapped data, FIG. 9 shows the process flow applied at the AP transceiver 110 and the WUR circuit 108 to WUP 250. Although described in the context of a WUP 250, the OFDM-based MCM system and the process described below may be used for any suitable low-rate data. In some examples, each processing block 612, 614, 416 shown as being performed at WUR circuit 108 represents an operation that may be implemented as a module or element that is part of a common integrated circuit. Similarly, each processing block 402, 604, 606 shown as being performed at AP transceiver 110 represents an operation that may for example be implemented as a module or element of a common integrated circuit.

In the example of FIG. 9, WUP 250 is provided as an OOK-mapped binary source 401 input to AP transceiver 110. In some examples, block encoding to apply error correction and/or compress data (e.g., encoding K bits to N bit codewords) can be applied to the binary source 401 by a block encoding operation 402, however such encoding is optional.

Figure 10:
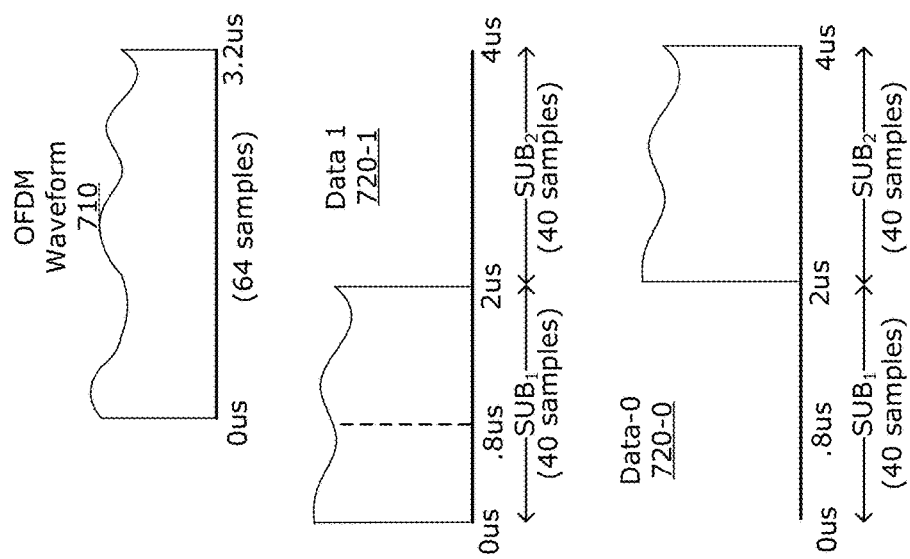
FIG. 10 is a time domain representation of example waveforms generated by the example system of FIG. 9.

The AP transceiver 110 performs an OFDM waveform generator operation 604 that is configured to output an OFDM waveform having the numerology parameters: M=16 (with $S_0$ used for a DC null); $T_u$=3.2 µs; and SS=312.5 Khz, with all available 15 subcarriers ($S_{-8}$ to $S_{-1}$ and $S_1$ to $S_7$) set to "1". An example illustration of the OFDM waveform 710 for an OFDM symbol as outputted by the OFDM waveform generator operation 604 is shown in time domain in FIG. 10. In the example of FIG. 10, the OFDM waveform 710 represents the output of a 16 point inverse fast Fourier transform (IFFT) operation in which a "1" has been modulated onto 15 subcarriers, and one of the subcarriers (for example $S_0$) used as a DC null.

In the example of FIG. 9, the OFDM waveform generator operation 604 may effectively be generating the same waveform repeatedly. Thus, the IFFT operation may not be needed each time the AP transceiver 110 transmits a WUR frame. Generation of the OFDM waveform may be separate from waveform coding. The generated waveform may be stored in a memory accessible by the AP transceiver 110 and the stored waveform may be retrieved from memory as needed. The OFDM waveform generator operation 604 may simply repeat the stored waveform, which would eliminate the need for an IFFT operation at the OFDM waveform generator operation 604. It should be noted that pre-generation of the waveform may also be used in the system of FIG. 6 (e.g., the OFDM symbol generation operation 404 may retrieve a stored waveform for generating the OFDM symbol).

In the example of FIG. 9, a Manchester coding operation 606 is used by the AP transceiver 110 to code the N data bits onto the OFDM waveform 710. Manchester coding (also known as phase encoding (PE)) is a line code in which the encoding of each data bit is either low then high, or high then low, of equal time. Accordingly, in the context of an OFDM waveform, the OFDM symbol is effectively divided into two sub-symbols of equal duration with each "0" bit is encoded as a set of two sub-symbols and, each "1" bit is encoded as set of two sub-symbols. In an example, the encoding may be as shown in the following table (although the reverse coding can be used in other embodiments):

TABLE 1

Manchester encoding of OOK data bits:

| OOK Data Bit | First sub-symbol $SUB_1$ | Second sub-symbol $SUB_2$ |
| --- | --- | --- |
| "1" | 1 (ON) | 0 (OFF) |
| "0" | 0 (OFF) | 1 (ON) |

Figure 11:
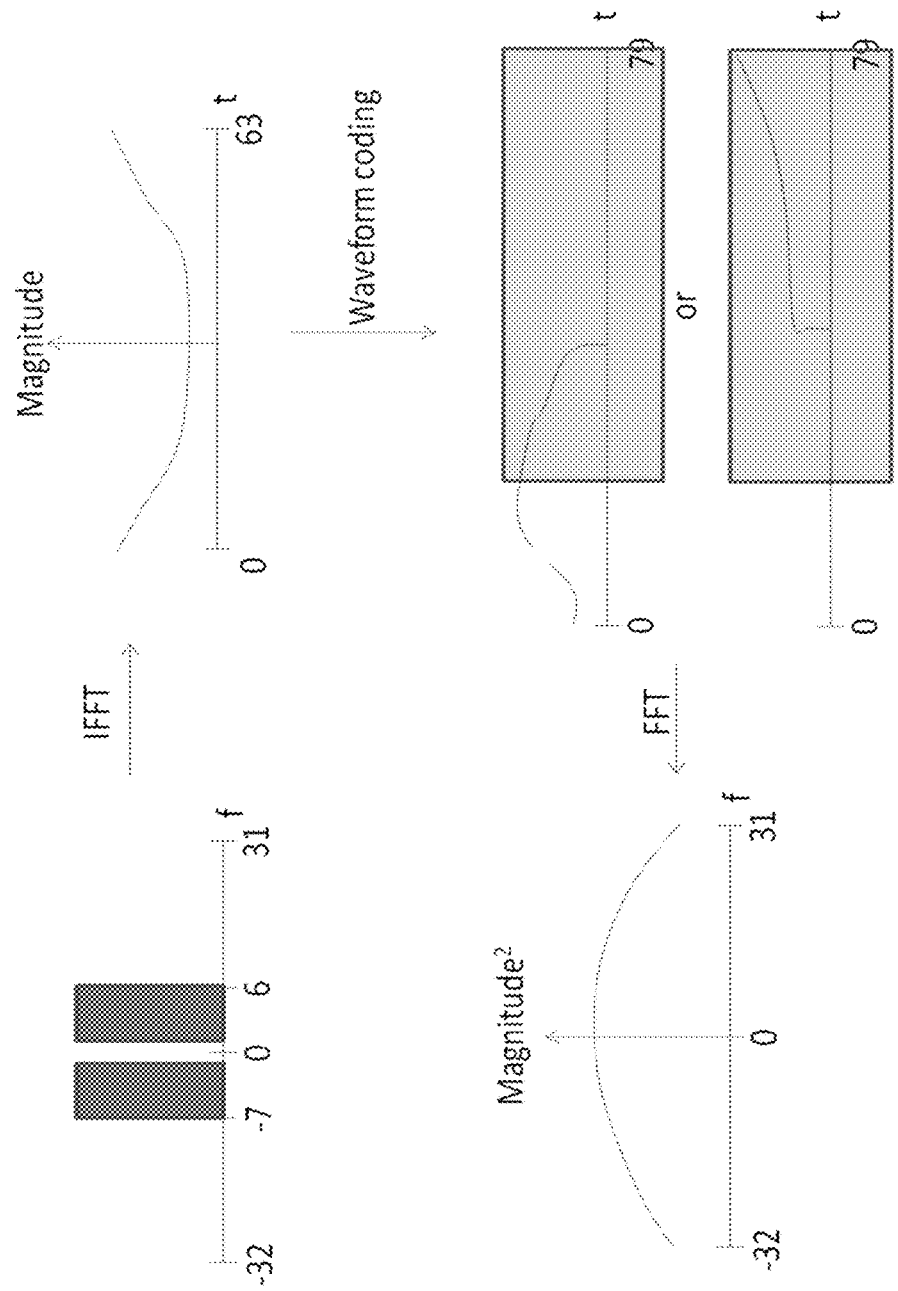
FIG. 11 shows an example of a simulation procedure for a frequency domain analysis of a Manchester coded wake-up packet.
Figure 12:
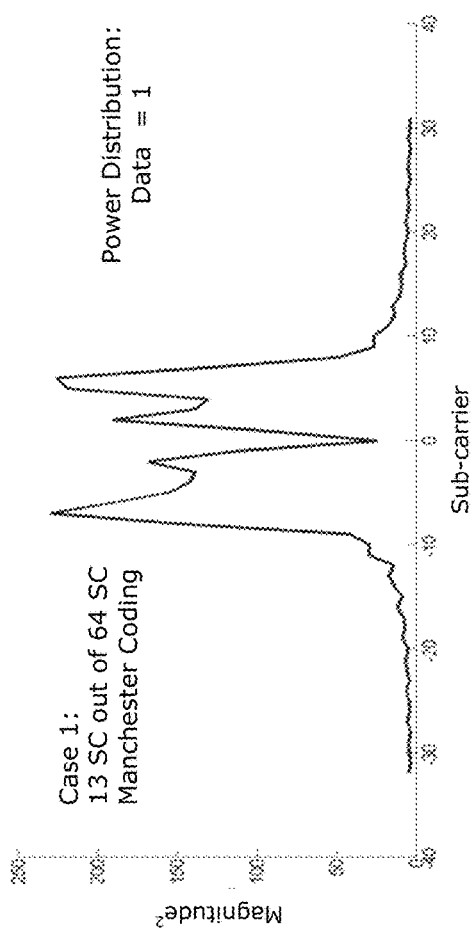
FIGS. 12 and 13 respectively show frequency domain power distribution for "1" and "0" sub-symbols for an example first case.
Figure 13:
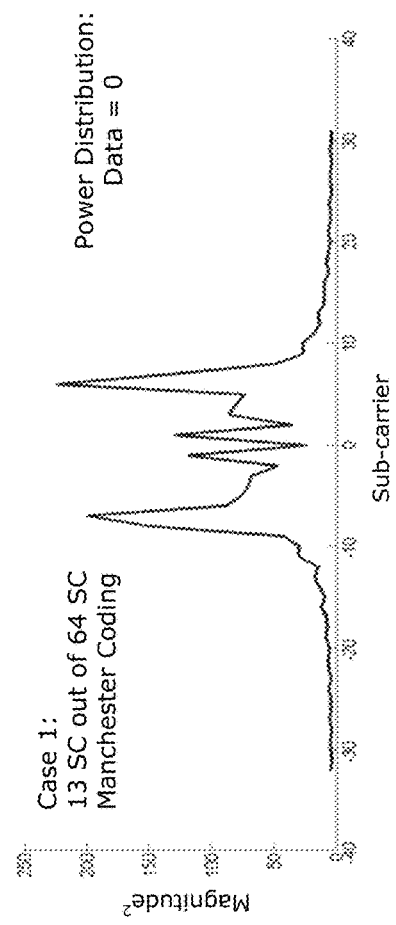
Figure 14:
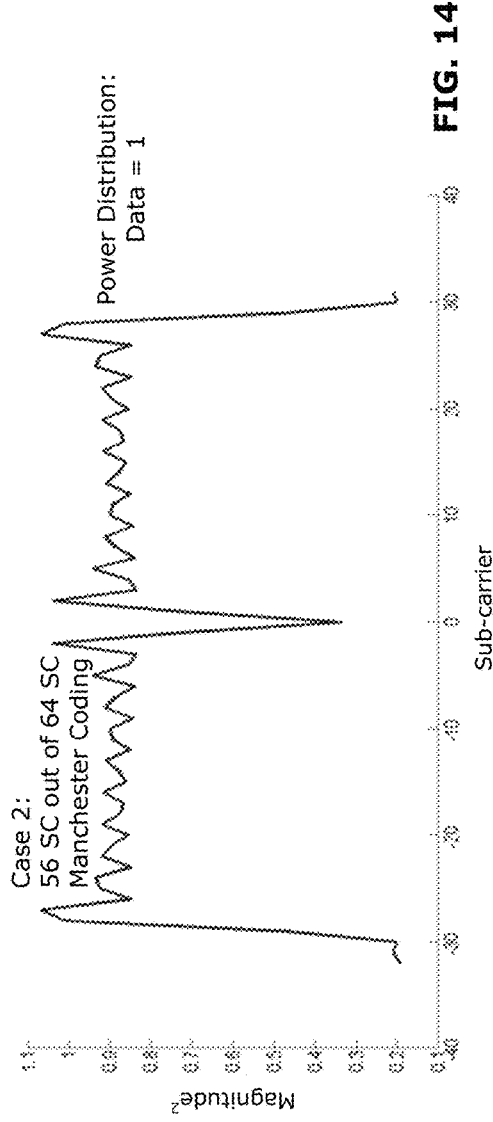
FIGS. 14 and 15 respectively show frequency domain power distribution for "1" and "0" sub-symbols for an example second case.
Figure 15:
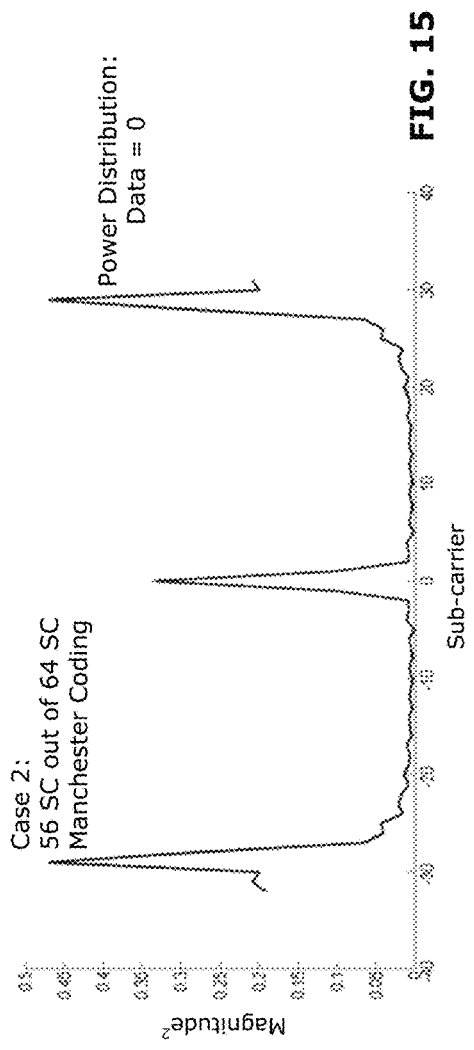

The Manchester coding operation 606 applies the PE coding to the OFDM waveform 710 in the time domain. FIGS. 10 and 11 illustrate, in time domain and frequency domain, respectively, the coding that is applied to the OFDM waveform 710 to generate a data "1" symbol 720-1 and a data "0" symbol 720-0 (generally referred to herein as data symbol 720).

In some example, the standard IEEE 802.11 sampling rate of 20 MHz is applied by the Manchester coding operation 606 when generating the data symbols 720. In this regard, the base OFDM waveform useful symbol duration of $T_u$=3.2 µs includes 64 samples. In typical IEEE 802.11 configurations, a 0.8 µs GI insertion occurs to being the total symbol time period $T_{tot}$ to 4.0 µs, which corresponds to 80 samples at 20 MHz. In some examples, the Manchester coding operation 606 is configured to include the equivalent of a GI to output symbols that have a total symbol time period $T_{tot}$ to 4.0 µs. Accordingly, in the case of a Data "1", the output symbol 720-1 includes a first sub-symbol $SUB_1$ of duration $T_{s1}=T_{tot}/2=2.0$ µs that includes 40 samples copied from the OFDM waveform 710, followed by a second sub-symbol $SUB_2$ of duration $T_{s2}=T_{tot}/2=2.0$ µs that includes 40 samples in which the sub-carrier values have been forced to "0". In the case of data "0" output symbol 720-0, the above order is reversed.

Thus, in some examples, each OOK-mapped data bit is represented at the output of the Manchester coding operation 606 as two MCM sub-symbols such that N data bits results in N symbols, each containing 2N successive-sub symbols. The resulting MCM symbols are then up-converted to a channel carrier frequency and transmitted as a Manchester-coded OFDM-based MCM WUP signal 250T-MCM through a wireless network channel 410. In some examples, the same transmit filter used for IEEE 802.11 is used to provide spectral filtering to ensure that the transmitted OFDM symbols, including any edge tones beyond the M subcarriers, fall within a 20 MHz spectral mask.

At the WUR 108, the OFDM-based MCM WUP signal 250T-MCM is received as part of a wake-up signal 152 and down-converted to baseband. In some examples, the WUR—Reference Signal 252 and/or Legacy preamble 210 encoded in the wake-up signal 152 may allow WUR 108 to synchronize sample timing to the incoming symbol boundaries. A power detection operation 612 at the WUR 108 is configured to measure the power distribution of each received symbol 720R, and in particular to determine a power level of the first sub-symbol and the second sub-symbol in each received symbol 720R. In the example of a 20 Mhz sampling rate, the first sub-symbol $SUB_1$ and second sub-symbol $SUB_2$ each include 40 samples. Decision block 614 is configured to compare the power distribution between the first and second halves of the symbol and make a corresponding data "0" or "1" decision. In the illustrated example, if the average power magnitude is greater in the first sub-symbol than the second sub-symbol, then the received symbol 720R is decoded as a data "1"; and if the average power magnitude is greater in the second sub-symbol than the first sub-symbol, then the received symbol 720R is decoded as a data "0". The recovered WUP 250R (with an intermediate block decoding operation 416 being applied in the event that block encoding occurred at AP transceiver 110). The recovered WUP 250R may, for example, contain information and instructions for internal wake-up signal 154 for the main WLAN transceiver circuit 106.

In some examples, a LPF 620 is included in the power detection operation 612 to apply low pass filtering to the received symbol 720R prior to power analysis. In some examples, the filter bandwidth may be greater than the transmission bandwidth. Having a filter bandwidth greater than the transmission bandwidth may enable detection of the MCM WUP signal 250T-MCM, because the original bandwidth is disturbed where waveform coding is applied in the time domain.

An analysis of a Manchester-coded OFDM-based MCM WUP, for example as discussed above, was performed by comparing three example MCM numerology cases: A first example case (case 1) used 13 tone occupancy out of 64 sub-carriers; a second example case (case 2) used 56 tone occupancy out of 64 sub-carriers; and a third example case used 15 tone occupancy out of 16 sub-carriers as disclosed in the examples described above. FIG. 11 shows a graphical representation of the procedure to perform a BW analysis for the three cases. In the analysis, waveform coding (WFC) was applied in time domain, and an FFT was performed on the subcarriers (without a Guard Interval (GI)) to obtain the power distribution (magnitude square of each sub-carrier) in the frequency domain. The resulting power distributions in the frequency domain are shown in FIGS. 12-17. The energy leakage beyond 4 MHz for case 1 can be seen in FIGS. 12 and 13, which results in poor performance at the receiver.

Figure 18:
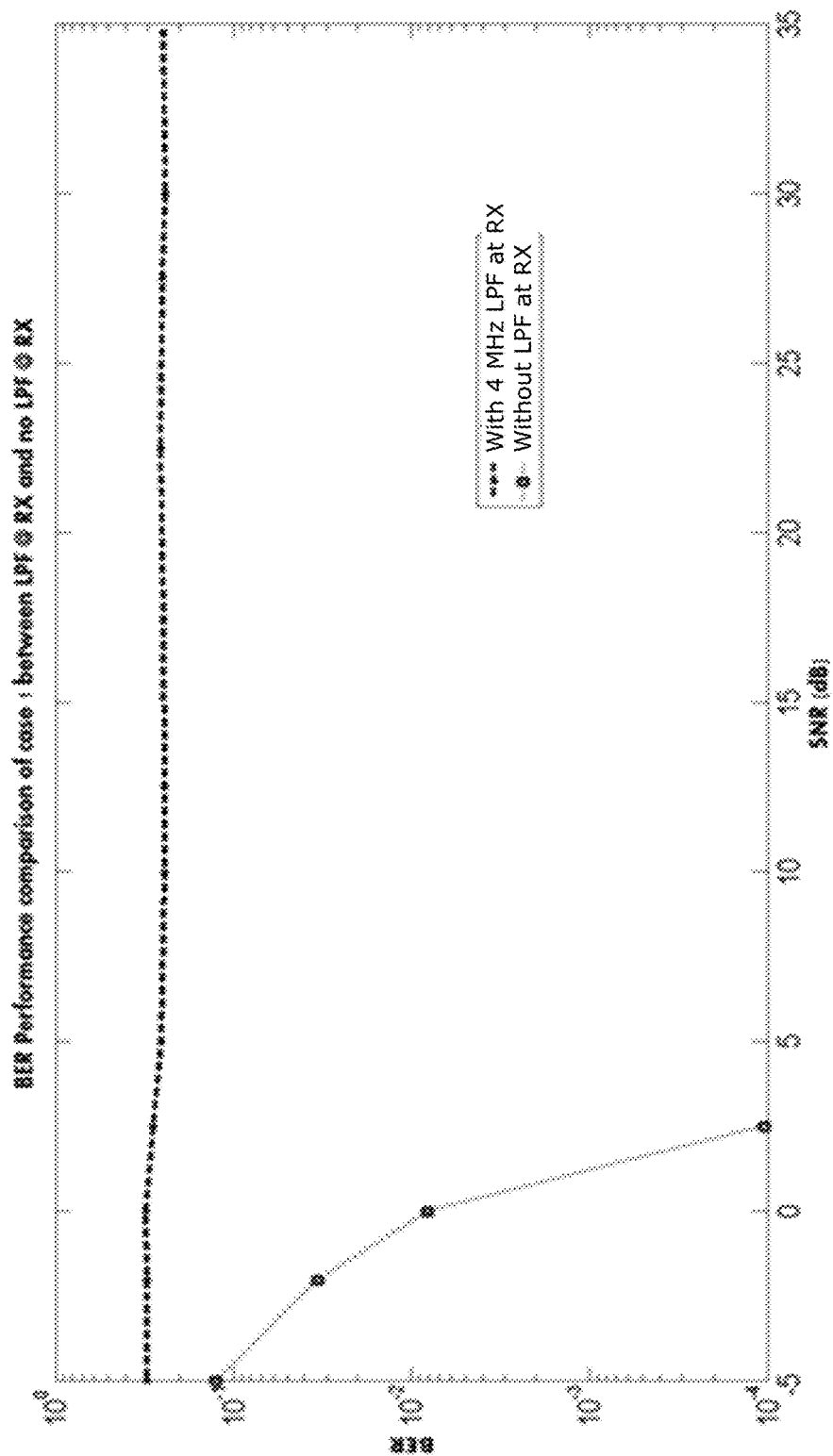
FIG. 18 shows a BER performance comparison for the example first case, comparing performance of a 4 MHz low pass filter at a receiver and no low pass filter.
Figure 19:
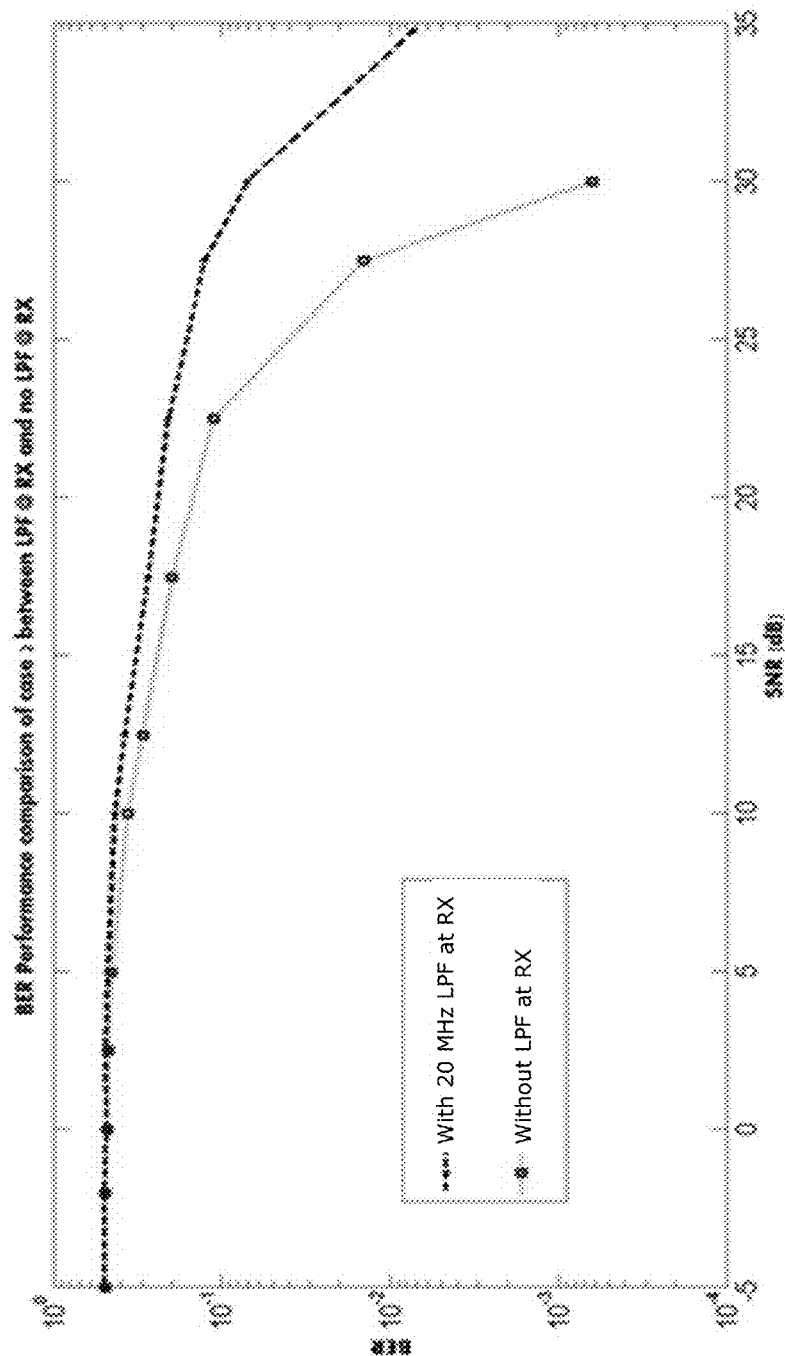
FIG. 19 shows a BER performance comparison for the example second case, comparing performance of a 20 MHz low pass filter at a receiver and no low pass filter.
Figure 20:
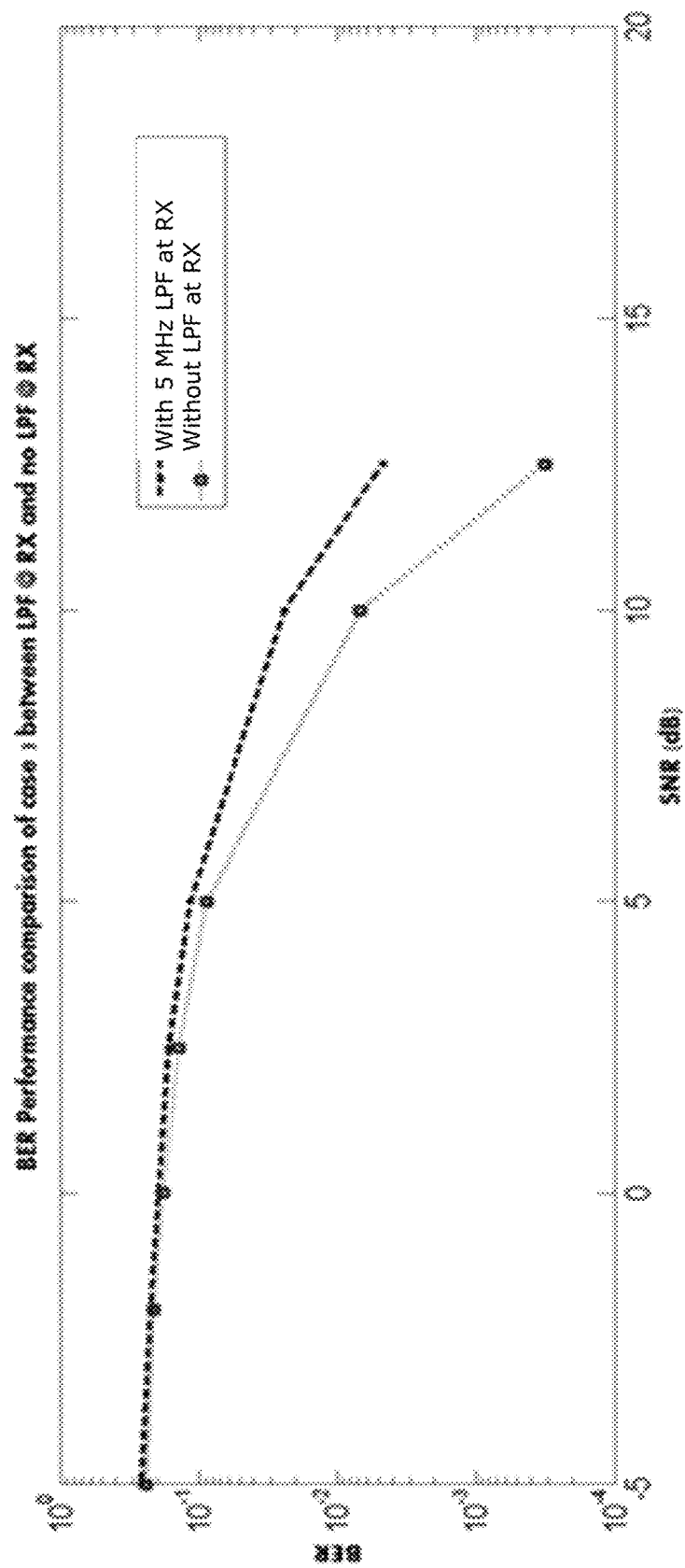
FIG. 20 shows a BER performance comparison for the example third case, comparing performance of a 5 MHz low pass filter at a receiver and no low pass filter.

FIGS. 18, 19 and 20 show the BER performances of the three cases, respectively. The original BW of each case is 4 MHz, 20 MHz, and 5 MHz, respectively. The performance comparisons between having a LPF at the receiver (RX) and no LPF are shown in FIGS. 18-20, where the LPFs are for 4 MHz, 20 MHz, and 5 MHz, respectively. FIG. 18 shows a BER performance comparison for the first case, comparing performance of a 4 MHz low pass filter at a receiver and no low pass filter; FIG. 19 shows a BER performance comparison for the second case, comparing performance of a 20 MHz low pass filter at a receiver and no low pass filter; and FIG. 20 shows a BER performance comparison for the third case, comparing performance of a 5 MHz low pass filter at a receiver and no low pass filter.

These simulations are obtained for the AWGN channel with RF impairments (specifically, carrier frequency offset and phase noise) considered. As can be seen from FIGS. 18-20, when the LPF is applied at the receiver, the performance degradation is severe for case 1, whereas the degradation for case 3 is minimal. For case 2, the TX power per tone is lower than narrowband transmission (i.e., the other two cases), which may cause the inferior performance to the other two cases, even if no LPF is used at the receiver.

Figure 21:
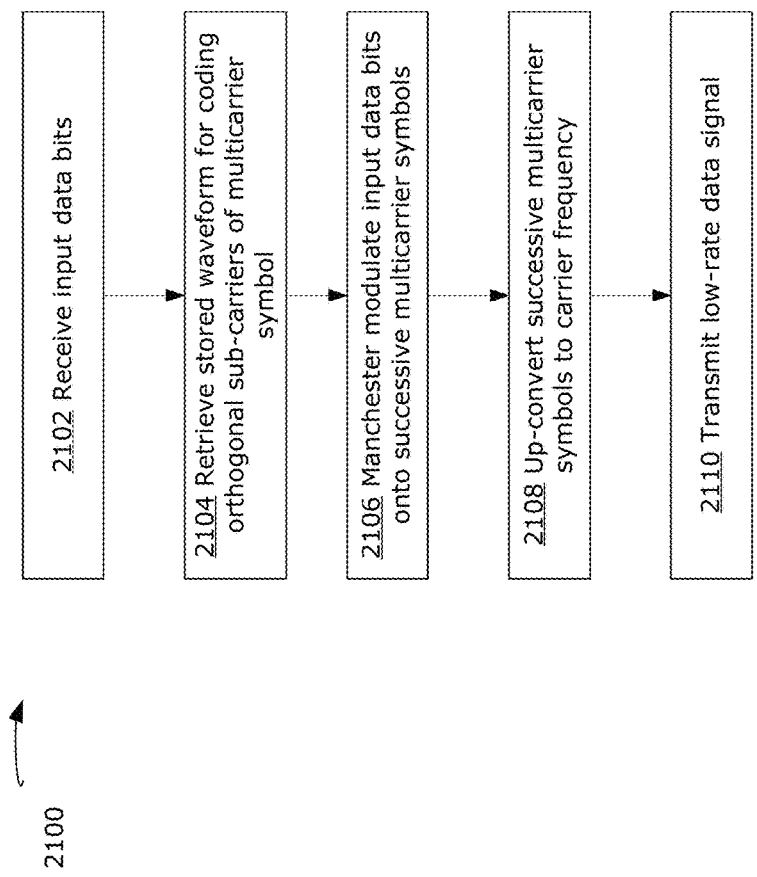
FIG. 21 is a flowchart illustrating an example method for providing a low-rate data signal.

FIG. 21 is a flowchart illustrating an example method 2100 for providing a low-rate data signal. The method 2100 may be performed by a transmitter of a low-rate data signal, for example at a transceiver of the AP transmitting a wake-up signal.

At 2102, input data bits are received. The input data bits may be data bits of a WUP, for example as described above, or other low-rate data signal. The input data bits may be mapped using OOK.

At 2104, a stored waveform for coding orthogonal sub-carriers of the multicarrier symbol is retrieved. The multicarrier symbol may include a null sub-carrier, for example as described above. The waveform for coding the symbol may be generated ahead of time and stored. Thus, generation of the waveform using IFFT may not be required for each transmission.

At 2106, the input data bits are Manchester modulated onto successive multicarrier symbols in the time domain. For example, where the multicarrier symbol has M orthogonal subcarriers, for each successive multicarrier symbol the corresponding data bit may be modulated onto each M−1 of the orthogonal subcarriers. In some examples, a guard interval period may be inserted into each successive multi-carrier symbol.

At 2108, the successive multicarrier symbols are up-converted to a carrier frequency to provide the low-rate data signal.

At 2110, the low-rate data signal is transmitted over a wireless channel.

The present disclosure describes example frame formats for a wake-up frame. In some examples, a design for a WUR-STF in a wake-up frame is described. The example OFDM symbols described herein may be used for coding a wake-up frame having the disclosed WUR-STF format. For example, a OOK-mapped, OFDM-based wake-up signal or a Manchester-coded, OFDM-based MCM wake-up signal may be used to transmit a wake-up frame having the disclosed WUR-STF. Other wake-up frame formats may be coded using the disclosed OFDM symbols, with OOK mapping or with Manchester coding, as appropriate.

Although described in the context of a wake-up packet, the waveform coding techniques (e.g., using OOK mapping or Manchester coding) disclosed herein may be applied to other low-rate data.

The present disclosure may provide certain example algorithms and calculations for implementing examples of the disclosed methods and systems. However, the present disclosure is not bound by any particular algorithm or calculation.

Although the present disclosure may describe methods and processes with steps in a certain order, one or more steps of the methods and processes may be omitted or altered as appropriate. One or more steps may take place in an order other than that in which they are described, as appropriate.

While the present disclosure may be described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method of providing a low-rate data signal, the method comprising:
   receiving input data bits;
   retrieving a stored multicarrier waveform for a multicarrier symbol, the multicarrier symbol including a null sub-carrier;
   Manchester modulating the input data bits onto successive multicarrier symbols in time domain, each multicarrier symbol being encoded as two sub-symbols of equal length, each multicarrier symbol having one sub-symbol encoded and stored with a corresponding half of the multicarrier waveform and one sub-symbol encoded and stored with a zero energy waveform;
   up-converting the successive multicarrier symbols to a carrier frequency to provide the low-rate data signal; and
   transmitting the low-rate data signal over a wireless channel.

2. The method of claim 1, wherein the multicarrier waveform is generated using inverse fast Fourier transform (IFFT) and stored in advance, and the multicarrier waveform is retrieved before each transmission.

3. The method of claim 1 further comprising:
   generating the multicarrier waveform using inverse fast Fourier transform (IFFT); and
   storing the multicarrier waveform.

4. The method of claim 1 wherein the input data bits are mapped using on-off keying (OOK).

5. The method of claim 1 wherein the multicarrier symbol comprises M orthogonal sub-carriers, wherein for each successive multicarrier symbol the corresponding data bit is modulated onto each of M−1 of the orthogonal sub-carriers.

6. The method of claim 5 wherein for each successive multicarrier symbol the corresponding data bit is modulated as "on" and "off" periods of equal duration.

7. The method of claim 5 wherein M equals 16 and the sub-carriers have an inter-carrier spacing (SS) of 312.5 KHz.

8. The method of claim 1 further comprising inserting a guard interval period into each of the successive multicarrier symbols.

9. The method of claim 1 wherein the input data bits are data bits of a wake-up packet and the low-rate data signal is a wake-up signal.

10. The method of claim 9 wherein the wake-up packet comprises a short training field, the short training field comprising a short training sequence enabling detection of the wake-up packet distinct from other signals.

11. A method at a receiver, the method comprising:
    receiving a low-rate data signal transmitted over a wireless channel;
    down-converting the low-rate data signal to recover successive multicarrier symbols, each multicarrier symbol comprising a set of orthogonal sub-carriers and a null sub-carrier, each multicarrier symbol having been encoded as two sub-symbols of equal length, each multicarrier symbol having one sub-symbol encoded with a corresponding half of a multicarrier waveform and one sub-symbol encoded with a zero energy waveform; and
    extracting data bits from each of the multicarrier symbols to recover the data bits of the low-rate data.

12. The method of claim 11, wherein extracting data bits comprises, for each received multicarrier symbol:
    applying an envelope detection operation to the received multicarrier symbol; and
    applying a decision threshold to the output of envelope detection operation.

13. The method of claim 11, wherein extracting data bits comprises, for each received multicarrier symbol:
    measuring power distribution of the received multicarrier symbol; and
    comparing power distribution between first and second halves of the received multicarrier symbol and determining the corresponding data bit to be a "1" or a "0" based on the comparison.

* * * * *